US012259317B2

(12) United States Patent
Sahara et al.

(10) Patent No.: US 12,259,317 B2
(45) Date of Patent: Mar. 25, 2025

(54) BROADBAND PULSED LIGHT SOURCE APPARATUS AND SPECTROSCOPIC MEASUREMENT METHOD

(71) Applicant: Ushio Denki Kabushiki Kaisha, Tokyo (JP)

(72) Inventors: Junki Sahara, Tokyo (JP); Aya Ota, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/632,427

(22) PCT Filed: Jul. 29, 2020

(86) PCT No.: PCT/JP2020/029168
§ 371 (c)(1),
(2) Date: Feb. 2, 2022

(87) PCT Pub. No.: WO2021/024890
PCT Pub. Date: Feb. 11, 2021

(65) Prior Publication Data
US 2022/0276153 A1 Sep. 1, 2022

(30) Foreign Application Priority Data

Aug. 2, 2019 (JP) ................. 2019-142715

(51) Int. Cl.
*G01N 21/31* (2006.01)
(52) U.S. Cl.
CPC ... *G01N 21/31* (2013.01); *G01N 2201/06113* (2013.01); *G01N 2201/0635* (2013.01); *G01N 2201/0636* (2013.01); *G01N 2201/08* (2013.01)

(58) Field of Classification Search
CPC ......... G01N 21/31; G01N 2201/06113; G01N 2201/0636; G01N 2201/0635; G01N 2201/08
See application file for complete search history.

(56) References Cited

U.S. PATENT DOCUMENTS

2003/0219205 A1  11/2003  Volodin et al.
2005/0099930 A1   5/2005  Volodin et al.
(Continued)

FOREIGN PATENT DOCUMENTS

JP      01272945  A  *  4/1988
JP     H03146942  A     6/1991
(Continued)

OTHER PUBLICATIONS

International Search Report (PCT/ISA/210) with translation mailed on Oct. 13, 2020, by the Japan Patent Office as the International Searching Authority for International Application No. PCT/JP2020/029168. (7 pages).
(Continued)

*Primary Examiner* — Uzma Alam
*Assistant Examiner* — Mohamed Doumbia
(74) *Attorney, Agent, or Firm* — BUCHANAN, INGERSOLL & ROONEY PC

(57) ABSTRACT

A nonlinear element provides a nonlinear effect to light output from a pulsed laser source. Remaining light component having the oscillation wavelength of the pulsed laser source is attenuated when the light is split by a dichroic mirror. The divided light is subjected to pulse stretching by a fiber, and is combined by a multiplexing element. The light thus combined is irradiated to a target object S. The light transmitted through the target object S is received by a photoreceiver. The output signal of the photoreceiver is converted by a calculation unit into a spectrum.

10 Claims, 13 Drawing Sheets

(56) References Cited

U.S. PATENT DOCUMENTS

| | | | |
|---|---|---|---|
| 2007/0153866 A1 | 7/2007 | Shchegrov et al. | |
| 2010/0056928 A1* | 3/2010 | Zuzak .................. | G01J 3/2823 |
| | | | 356/302 |
| 2012/0063484 A1 | 3/2012 | Goddard et al. | |
| 2012/0236314 A1* | 9/2012 | Fermann .................. | H01S 3/10 |
| | | | 356/479 |
| 2014/0056023 A1 | 2/2014 | Hasegawa | |
| 2016/0223400 A1* | 8/2016 | Carron ...................... | G01J 3/44 |
| 2017/0059490 A1* | 3/2017 | Zhao ......................... | G01J 3/12 |
| 2018/0375296 A1* | 12/2018 | Zediker ...................... | H01S 5/14 |
| 2019/0129278 A1* | 5/2019 | Ichihara .................. | G02F 1/365 |
| 2020/0166406 A1 | 5/2020 | Ota et al. | |

FOREIGN PATENT DOCUMENTS

| | | | | |
|---|---|---|---|---|
| JP | H0829815 A | | 2/1996 | |
| JP | 2003084364 A | | 3/2003 | |
| JP | 2005521076 A | | 7/2005 | |
| JP | 3855707 B2 | * | 12/2006 | |
| JP | 2007172682 A | | 7/2007 | |
| JP | 2007519940 A | | 7/2007 | |
| JP | 2008538163 A | | 10/2008 | |
| JP | 2009222531 A | | 10/2009 | |
| JP | 2013072962 A | * | 4/2013 | ............. G02F 1/365 |
| JP | 2013205390 A | | 10/2013 | |
| JP | 2015114539 A | * | 6/2015 | |
| WO | WO-2017175747 A1 | * | 10/2017 | ............. G01N 21/01 |
| WO | WO-2018225799 A1 | * | 12/2018 | ............. G01J 3/433 |

OTHER PUBLICATIONS

International Preliminary Report on Patentability (Form PCT/IB/373) and Written Opinion (PCT/ISA/237) with translation mailed on Oct. 13, 2020, by the Japan Patent Office as the International Searching Authority for International Application No. PCT/JP2020/029168. (12 pages).

Extended European Search Report dated Sep. 8, 2023, issued in corresponding European Application No. 20851090.9. (10 pages).

Office Action (Notice of Reasons for Refusal) issued on Jun. 18, 2024, in corresponding Japanese Patent Application No. 2021-537260 and machine English translation of the Office Action. (18 pages).

Office Action issued on Aug. 28, 2024, in corresponding Chinese Patent Application No. 202080049833.0 and machine English translation of the Office Action. (25 pages).

Lumeau et al., "Tunable Ultra—Narrow Band—Pass Filters Based on Volume Bragg Grating", 2006 Conference on Lasers and Electro, CWK1, p., Optics and 2006 Quantum Electronics and Laser Science Conference, (2006 month unknown), pp. 1-2.

Office Action (Decision of Dismissal of Amendment) issued on Oct. 22, 2024, in corresponding Japanese Patent Application No. 2021-537260 and machine English translation of the Office Action. (9 pages).

Takahashi et al., "Polarization—Insensitive Arrayed—Waveguide Wavelength Multiplexer With Birefringen Cecompensating Film", IEEE Photonics Technology Letters, (Jun. 1993), vol. 5, No. 6, pp. 707-709.

* cited by examiner

FIG. 13

| TIME POINT IN PULSE | WAVELENGTH | REFERENCE SPECTRUM DATA | MEASUREMENT VALUE | ABSORPTION SPECTRUM |
|---|---|---|---|---|
| t1 | $\lambda 1$ | V1 | v1 | v1/V1 |
| t2 | $\lambda 2$ | V2 | v2 | v2/V2 |
| t3 | $\lambda 3$ | V3 | v3 | v3/V3 |
| ⋮ | ⋮ | ⋮ | ⋮ | ⋮ |
| tn-2 | $\lambda$ n-2 | Vn-2 | vn-2 | vn-2/Vn-2 |
| tn-1 | $\lambda$ n-1 | Vn-1 | vn-1 | vn-1/Vn-1 |
| tn | $\lambda$ n | Vn | vn | vn/Vn |

BROADBAND PULSED LIGHT SOURCE APPARATUS AND SPECTROSCOPIC MEASUREMENT METHOD

BACKGROUND

1. Technical Field

The present disclosure relates to a light source apparatus that outputs broadband pulsed light, and particularly to an apparatus and a method for providing spectroscopic analysis of a target object using the broadband pulsed light.

2. Description of the Related Art

As a typical example of a pulsed light source, a pulse oscillation laser (pulsed laser) is known. In recent years, investigation to extend the wavelength of pulsed lasers is being intensively advanced. Typical examples of such investigation include the generation of supercontinuum light (which will be referred to as "SC light" hereafter) using nonlinear optical effects. SC light is generated using nonlinear effects that occur when high-intensity light interacts with a material. An increased photon density allows nonlinear effects to be actively generated. For example, high-efficiency generation of SC light is possible by focusing light having high peak power, such as a pulsed laser, such that it is incident to a fiber having a core diameter of several μm. In a case in which light having high photon density propagates through such a fiber over a long distance, this provides continuous generation of nonlinear effects, thereby providing SC light with a wider bandwidth. The main nonlinear effects used in SC light generation include self-phase modulation, mutual phase modulation, Raman scattering, and four-wave mixing.

RELATED ART DOCUMENTS

Patent Documents

[Patent Document 1]
Japanese Patent Application Laid Open No. 2013-205390
It is considered that such SC light is suitable for various kinds of usages due to its wide wavelength bandwidth. That is to say, it is anticipated that SC light will be applied based on its features to various fields such as material analysis in which wavelength dependence is measured for a material, image observation such as OCT image observation, fluorescence microscopy, or the like, etc., as well as the field of optical communications such as multi-wavelength multi-plexing communication.

In particular, it is anticipated that broadband pulsed light (broadband extended pulsed light) obtained by extending the pulse width of the SC light by means of a pulse stretching element can be suitably employed in the field of spectroscopic measurement, etc. Broadband pulsed light has an extended wavelength range, but has a narrow pulse width (time width). However, in a case of employing a transmission element such as a fiber that provides a group delay, such an arrangement is also capable of extending the pulse width. In this case, by selecting an element having appropriate wavelength dispersion characteristics, this enables pulse stretching such that the time (elapsed time) in a pulse corresponds to the instantaneous wavelength in a one-to-one manner.

The correspondence relation between time and wavelength in broadband extended pulsed light as described above can be effectively used in spectroscopic measurement. In a case in which the broadband extended pulsed light is received by a photoreceiver, the change in light intensity over time received by the photoreceiver corresponds to the light intensity of each wavelength, i.e., the spectrum. Accordingly, this is capable of converting the change of the output signal of the photoreceiver in the time domain into a spectrum. This supports spectroscopic measurement without using a special dispersive element such as a diffraction grating or the like. That is to say, after the broadband stretched pulsed light is irradiated to a target object, the light from the target object is received by a photoreceiver so as to measure changes of the light with time. With this, the spectroscopic characteristics (e.g., spectral transmittance) of the target object can be acquired.

As described above, SC light is anticipated to be applied in various kinds of fields. However, SC light has unique problems. As one of such problems, pulsed laser light used to generate SC light has a strong peak. Description will be made with reference to FIGS. 15A and 15B regarding this point. FIGS. 15A and 15B are conceptual diagrams for explaining the problem in SC light generation.

As described above, in the technique for generating SC light, ultrashort pulsed light is made incident to a nonlinear optical element so as to provide nonlinear optical effects such as self-phase modulation, four-wave mixing, Raman scattering, etc., thereby generating light with a new wavelength, thereby generating broadband light. In many cases, the currently commercially available SC light sources employ ultrashort pulsed light in the picosecond to nanosecond range.

As shown in FIG. 15A, the original ultrashort pulsed light (in some cases, also referred to as "seed light" or "seeder", and which will be referred to as "seed light" hereafter) is light having a very narrow bandwidth with the oscillation wavelength $\lambda_s$ as the center. However, in a case in which the seed light is made incident to a nonlinear element such as a nonlinear fiber, this provides broadband pulsed light as shown in FIG. 15B. Although this provides such broadband pulsed light, in many cases, the seed light spectrum remains in the form of a ripple in the SC light spectrum. It should be noted, for convenience of explanation, that the width between the wavelengths at which the light intensity becomes half that at the oscillation wavelength (peak wavelength) $\lambda_s$ (i.e., half width) will be referred to as an "oscillation wavelength range", which is indicated by Rh in FIG. 15A.

The seed light spectrum remaining as a ripple can become a problem depending on the SC light application field. In a case in which only a particular wavelength is used from the broad bandwidth of the SC light, and in a case in which the particular light to be used is not included in the wavelength range of the seed light, in many cases, this does not become a large problem. However, in a case in which there is a need to irradiate light having an intensity that is as uniform as possible for each wavelength, as in measurement of the wavelength dependence of a material, in some cases, this becomes a problem.

As a more specific example, in a case in which the SC light pulse extended as described above is used in spectroscopic measurement, variation of intensity in the SC light spectrum has a large effect on the dynamic range in the measurement. That is to say, in a case in which a ripple due to the seed light remains strong, in order to provide spectroscopic measurement, this requires a photoreceiver to have a dynamic range that is wider according to the intensity of the ripple. In this case, due to the finite number of bits to be used for data processing, the intensity resolution in the measurement decreases according to such a wider dynamic range. Degraded intensity resolution leads to a fundamental problem in that analysis accuracy drastically degrades or analysis cannot be made in analysis in which a slight difference in measured values is discriminated, as is the case in material analysis with the near infrared region.

SUMMARY

The present disclosure has been made in order to solve such a problem described above in a broadband pulsed light source for outputting SC light. Accordingly, it is an exemplary purpose of the present disclosure to provide a high-performance broadband pulsed light source apparatus that solves a problem of SC light in that light in a wavelength range of seed light remains with a high intensity, and to provide an advanced application technique using such a light source apparatus.

In order to solve the problems described above, a broadband pulsed light source apparatus according to the present disclosure includes: a pulsed laser source; a nonlinear element structured to provide a nonlinear effect to light output from the pulsed laser source, so as to output supercontinuum light; and an attenuation unit structured to attenuate light component having an oscillation wavelength of the pulsed laser source contained in the supercontinuum light output from the nonlinear element.

Also, in order to solve the problems described above, the broadband pulsed light source apparatus may further include a stretching element structured to extend the pulse width of the supercontinuum light output from the nonlinear element, wherein an output light of the stretching element has a one-to-one correspondence between the instantaneous wavelength and time.

Also, in order to solve the problems described above, the attenuation unit may include a notch filter.

Also, in order to solve the problems described above, the attenuation unit may include a volume Bragg grating filter.

Also, in order to solve the problems described above, the attenuation unit may include a dichroic mirror. Also, the oscillation wavelength of the pulsed laser source may be within a division wavelength region of the dichroic mirror.

Also, in order to solve the problems described above, in the broadband pulsed light source apparatus, the attenuation unit may include a first dichroic mirror and a second dichroic mirror. Also, the oscillation wavelength of the pulsed laser source may be within a division wavelength region of the first dichroic mirror and the second dichroic mirror. Also, the second dichroic mirror may be structured as a wave combiner structured to combine light divided by the first dichroic mirror.

Also, in order to solve the problems described above, the broadband pulsed light source apparatus may include a divider structured to spatially divide the supercontinuum light output from the nonlinear element into multiple light components by wavelength. Also, the attenuation unit may include a filter structured to attenuate one of the multiple light components having the oscillation wavelength of the pulsed laser.

Also, in order to solve the problems described above, the divider may include an arrayed waveguide grating.

Also, in order to solve the problems described above, the attenuation unit may include an arrayed waveguide grating structured to spatially divide the supercontinuum light into multiple light components by wavelength. The arrayed waveguide grating may attenuate one of the multiple light components having the oscillation wavelength of the pulsed laser source.

Also, in order to solve the problems described above, the oscillation wavelength of the pulsed laser source may be within a boundary wavelength region of output-side waveguides of the arrayed waveguide grating.

Also, in order to solve the problems described above, in the broadband pulsed light source apparatus, the attenuation unit may include a dichroic mirror. Also, the oscillation wavelength of the pulsed laser source may be within a division wavelength region of the dichroic mirror. Also, the stretching element may include a first stretching element structured to extend the pulse width of light reflected by the dichroic mirror, and a second stretching element structured to extend the pulse width of light transmitted through the dichroic mirror.

Also, in order to solve the problems described above, the first stretching element and the second stretching element may be structured as fibers having different lengths or different dispersion characteristics.

Also, in order to solve the problems described above, in the broadband pulsed light source apparatus, the attenuation unit may include a dichroic mirror. Also, the oscillation wavelength of the pulsed laser source may be within a division wavelength region of the dichroic mirror. Also, the dichroic mirror may be arranged on an output side of the stretching element.

Also, in order to solve the problems described above, the broadband pulsed light source apparatus includes a divider structured to spatially divide the supercontinuum light output from the nonlinear element into multiple light components by wavelength. Also, the attenuation unit may include a filter structured to attenuate one of the light components having the oscillation wavelength of the pulsed laser. Also, the stretching element may include multiple fibers arranged in parallel on an output side of the divider. Also, each fiber may receive corresponding one of the multiple light components as its incident light at the corresponding wavelength region. Also, the respective fibers may be structured to have different lengths or different dispersion characteristics according to the wavelength regions of the incident light.

Also, in order to solve the problems described above, in the broadband pulsed light source apparatus, the attenuation unit may include an arrayed waveguide grating structured to spatially divide the supercontinuum light into multiple light components by wavelength. The arrayed waveguide grating may attenuate one of the multiple components having the oscillation wavelength of the pulsed laser source. Also, the stretching element may be structured as fibers each coupled to a corresponding output-side waveguide of the arrayed waveguide grating. Also, each fiber may be structured to have a different length or different dispersion characteristics according to the wavelength region of the incident light.

Also, in order to solve the problems described above, a spectroscopic measurement apparatus according to the present invention includes: a photoreceiver structured to receive light from a target object to which broadband pulsed light is irradiated from the broadband pulsed light source apparatus described above; and a calculation unit structured to convert an output signal from the photoreceiver into a spectrum.

Also, in order to solve the problems described above, a spectroscopic measurement apparatus according to the present invention includes: the broadband pulsed light source apparatus described above; a photoreceiver structured to receive light from a target object to which broadband pulsed light is irradiated from the broadband pulsed light source apparatus; and a calculation unit structured to convert an output signal from the photoreceiver into a spectrum. The attenuation unit is structured as a dichroic mirror. The oscillation wavelength of the pulsed laser source is within a division wavelength region of the dichroic mirror. As the photoreceiver, a first photoreceiver structured to receive incident light reflected by the dichroic mirror, and a second photoreceiver structured to receive incident light transmitted through the dichroic mirror are provided.

Also, in order to solve the problems described above, a spectroscopic measurement method according to the present invention includes: receiving, by means of a photoreceiver, light from a target object to which broadband pulsed light is irradiated from the broadband pulsed light source apparatus described above; and converting an output signal from the photoreceiver into a spectrum by means of a calculation unit.

Also, in order to solve the problems described above, a spectroscopic measurement method according to the present invention includes: receiving, by means of a photoreceiver, light from a target object to which broadband pulsed light is irradiated from the broadband pulsed light source apparatus described above; and converting an output signal from the photoreceiver into a spectrum by means of a calculation unit. The attenuation unit is structured as a dichroic mirror. The oscillation wavelength of the pulsed laser source is within a division wavelength region of the dichroic mirror. As the photoreceiver, a first photoreceiver structured to receive incident light reflected by the dichroic mirror, and a second photoreceiver structured to receive incident light transmitted through the dichroic mirror, are provided. In the light receiving, light is received by the first photoreceiver and the second photoreceiver. In the conversion, output signals from the first photoreceiver and the second photoreceiver are converted into a spectrum by means of the calculation unit.

Also, in order to solve the problems described above, a spectroscopic measurement method according to the present invention includes: receiving, by means of a photoreceiver, light from a target object to which broadband pulsed light is irradiated from the broadband pulsed light source apparatus described above; and analyzing the target object by processing an output signal from the photoreceiver by means of a calculation unit so as to compare the output signal with a reference value, thereby analyzing the target object. The supercontinuum light output from the broadband pulsed light source apparatus has an intensity width that is equal to or smaller than 3 dB.

As described below, with the broadband pulsed light source apparatus according to the present invention, the attenuation unit attenuates the light at the oscillation wavelength of the pulsed laser source, thereby providing a spectrum having a flatter intensity distribution. This provides a broadband pulsed light source apparatus suitably employed in a usage that requires SC light having a flatter intensity distribution.

Also, in a case in which the attenuation unit is a notch filter, this enables a simple configuration, thereby providing the above-described effects with a low cost.

Also, in a case in which the attenuation unit includes a volume Bragg grating filter, this easily enables selective attenuation in a narrower bandwidth. This allows only the light at the oscillation wavelength of the pulsed laser source to be removed with high precision.

Also, in a case in which the attenuation unit includes a dichroic mirror, this provides selective attenuation in a state in which the SC light is divided into wavelength regions. This allows the SC light to be irradiated using an advantage of the SC light thus divided into wavelength regions.

Also, with an arrangement provided with the stretching element, the pulse width is widened in a state in which the elapsed time and the instantaneous wavelength of the light in each pulse has a one-to-one correspondence, thereby outputting more convenient SC light.

Also, with an arrangement provided with a divider and configured such that the light at the oscillation wavelength of the pulsed laser from among the wavelength regions divided by the divider is attenuated by a filter, the light at the respective wavelength regions thus divided may be transmitted via the fibers having different lengths or different dispersion characteristics so as to provide pulse stretching. This allows the pulse stretching to be easily optimized.

Also, in a case in which the array wavelength grating is provided as an attenuation unit having a function of providing selective attenuation, this allows the number of its components to be reduced, thereby allowing a cost to be reduced, and thereby providing a simple configuration. In this case, with an arrangement in which the oscillation wavelength of the pulsed laser source is within a boundary wavelength region provided by the output-side waveguides of the arrayed waveguide, this provides an effect of no occurrence of new loss in the arrayed waveguide grating due to attenuation.

Also, in spectroscopic measurement using the broadband pulsed light source apparatus configured to provide pulse stretching so as to provide a one-to-one correspondence between the elapsed time and the instantaneous wavelength of the light in each pulse, such an arrangement requires no time-consuming operation such as scanning of a grating, thereby providing high-speed spectroscopic measurement.

In particular, spectroscopic measurement can be performed using the broadband light irradiated with a uniform spectral intensity obtained by selectively attenuating the light at the oscillation wavelength of the pulsed laser source. This allows the measurement results to be obtained without a need to greatly widen the dynamic range. Accordingly, this provides a spectroscopic measurement apparatus and a spectroscopic measurement method with high intensity resolution.

Also, with an arrangement employing a dichroic mirror as an attenuation unit configured to receive the light divided into respective divided wavelength regions by means of separate photoreceivers so as to convert the output signals thereof into a spectrum, such an arrangement is capable of selectively using a suitable photoreceiver according to the wavelength region. In this respect, this allows the spectroscopic measurement to be optimized.

Finally, in spectroscopic analysis in which the results of the spectroscopic measurement are compared with reference values with a spectral intensity width of 3 dB or less, this allows sufficient avoidance of a problem in that the measurement cannot be provided due to insufficient resolution required to detect a slight difference in the spectrum.

BRIEF DESCRIPTION OF THE DRAWINGS

FIG. 13 is a schematic diagram showing main components of an example of a measurement program provided to the spectroscopic measurement apparatus;

DETAILED DESCRIPTION

Next, description will be made regarding a form (embodiment) for providing the present invention.

Figure 1:
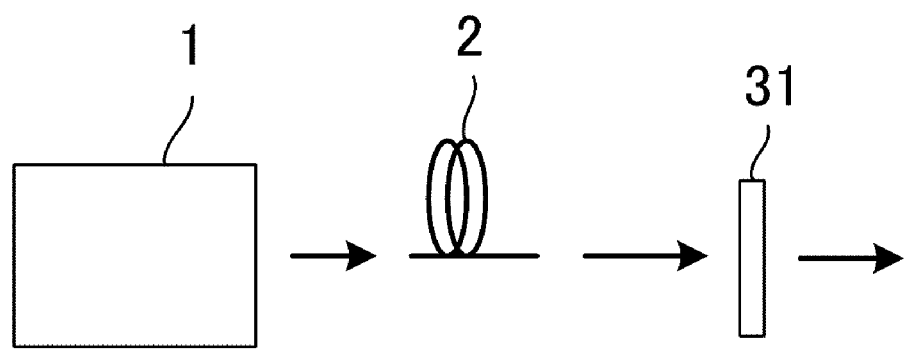
FIG. 1 is a schematic diagram showing a broadband pulsed light source apparatus according to a first embodiment.

First, description will be made regarding a broadband pulsed light source apparatus according to an embodiment of the invention. FIG. 1 is a schematic diagram showing a broadband pulsed light source apparatus according to a first embodiment.

The broadband pulsed light source apparatus is configured as an apparatus that outputs SC light. As shown in FIG. 1, the broadband pulsed light source apparatus includes a pulsed laser source 1, a nonlinear element 2 arranged at a position so as to receive incident light from the pulsed laser source 1, and an attenuation unit for selectively attenuating the SC light output from the nonlinear element 2.

As the pulsed laser source 1, an ultrashort pulsed laser source is preferably employed. Also, a gain switch laser, microchip laser, fiber laser, or the like may be employed. For example, as the pulsed laser source 1, a fiber laser having the oscillation wavelength of 1064 nm and a pulse width of several picoseconds to several nanoseconds may be employed.

As the nonlinear element 2, in many cases, a fiber is employed. For example, a photonic crystal fiber or other nonlinear fiber may be employed as the nonlinear element 2. In many cases, single-mode fibers are employed. However, multi-mode fibers may also be employed as the nonlinear element 2 so long as they exhibit sufficient nonlinearity.

Description will be made in the embodiment assuming a broadband pulsed light source apparatus provided for use in spectroscopic measurement in a range of 900 nm to 1300 nm described later. Accordingly, the SC light having a bandwidth widened by the nonlinear element 2 has a range of 900 to 1300 nm. It should be noted that there is no specific definition of "supercontinuum light" in particular. Specifically, no definition has been established for the degree of the wavelength range of a continuous spectrum to be provided by "supercontinuum light". For example, in a case in which light has a continuous spectrum over 30 nm or more, the light can be said to be "SC light". Also, in a case in which the light has a continuous spectrum over 50 nm or more, the light can be said to be "SC light". Also, in a case in which light has a continuous spectrum over 100 nm or more, the light can be said to be "SC light". Description will be made below assuming that, in a case in which light generated using nonlinear optical effects has a continuous spectrum over 50 nm or more, the light is SC light. Accordingly, the broadband pulsed light source apparatus according to this embodiment is an apparatus that outputs light having a continuous spectrum over at least 50 nm in any range from 900 to 1300 nm.

Figure 2A:
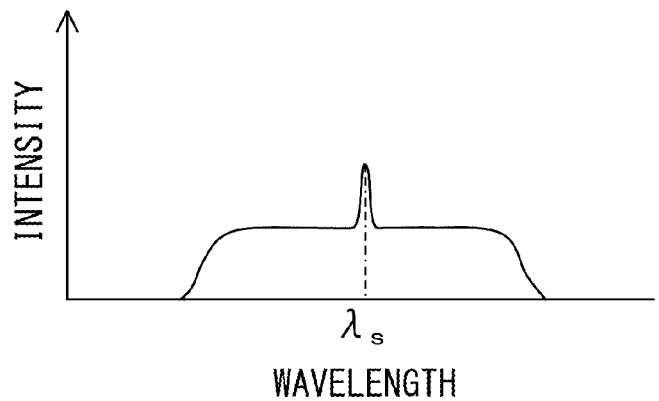
FIG. 2A is a diagram showing a spectrum of the output SC light according to the first embodiment.
Figure 2B:
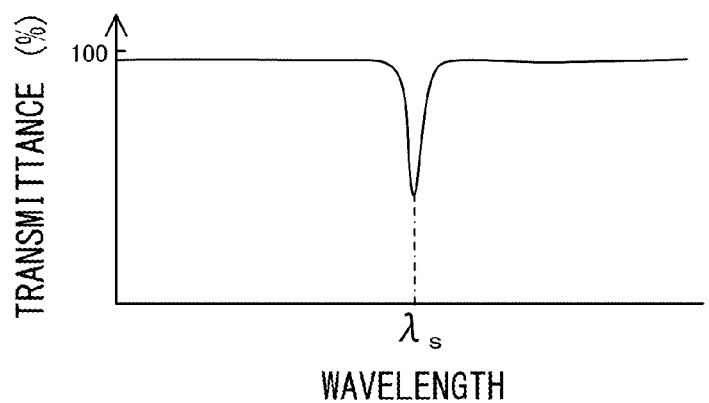
FIG. 2B is a diagram showing an attenuation unit according to the first embodiment.

The attenuation unit, which is a feature of the broadband pulsed light source apparatus according to the embodiment, is a means for attenuating light in a wavelength region of the seed light, i.e., light at the oscillation wavelength of the pulsed laser source 1. There are several conceivable examples as the attenuation unit. In this embodiment, a notch filter 31 is employed. Description will be made with reference to FIGS. 2A-2C regarding the attenuation unit according to a first embodiment. FIGS. 2A and 2B show diagrams showing the attenuation unit according to the first embodiment. FIG. 2A is a diagram showing a spectrum of the output SC light according to the first embodiment. FIG. 2B is a diagram showing the spectral transmission characteristics of the notch filter employed as the attenuation unit.

Figure 2C:
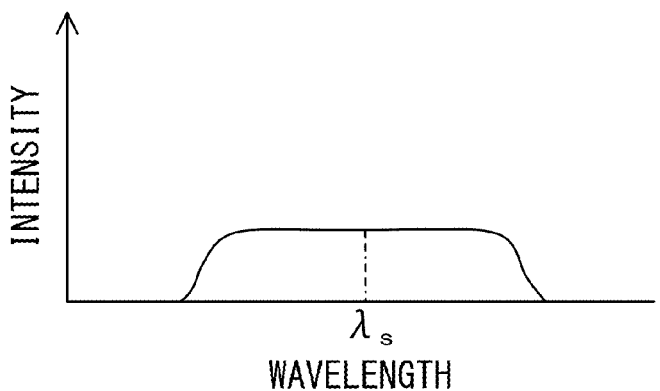
FIG. 2C is a diagram showing a spectrum of the SC light after it transmits through the notch filter configured as an attenuation unit.

As shown in FIGS. 2A-2C, the notch filter 31 is configured as an attenuation unit that selectively attenuates the light component of the SC light having the oscillation wavelength of the pulsed laser source 1. As described above, the oscillation wavelength region Rh of the pulsed laser source 1 is defined as the wavelength region having the half-width with respect to the peak wavelength (oscillation wavelength) $\lambda_s$, for example. As shown in FIGS. 2A-2C, the notch filter 31 is more preferably designed to have characteristics such that the wavelength at which the notch filter 31 provides the smallest transmittance (which will be referred to as the "bottom wavelength" hereafter) matches the oscillation wavelength $\lambda_s$ of the pulsed laser source 1. It should be noted that they do not need to strictly match each other. Rather, the bottom wavelength may preferably be included in the range of the oscillation wavelength region Rh of the pulsed laser source 1. As the characteristics of the notch filter 31, the wavelength region that provides an attenuation ratio of 50% or more with respect to the maximum value (attenuation ratio at the bottom wavelength) is defined as the attenuation wavelength region. With this, in a case in which the oscillation wavelength $\lambda_s$ of the pulsed laser source 1 is within the attenuation region, such an arrangement provides a sufficient effect, thereby providing an attenuation unit.

The degree of attenuation of light to be provided by the notch filter 31, i.e., the degree of the transmittance at the bottom wavelength, is designed based on the magnitude of the ripple of light at the oscillation wavelength of the pulsed laser source 1. For example, in a case in which the ripple of light has a magnitude on the order of twice the magnitude of light at other wavelengths, the transmittance at the bottom wavelength is designed on the order of 50%. That is to say, the notch filter 31 is designed to have characteristics for selectively attenuating the light with an attenuation ratio on the order of 50%.

FIG. 2C is a diagram showing a spectrum of the SC light after it transmits through the notch filter 31 configured as an attenuation unit. As shown in this drawing, the ripple originating due to the seed light is removed, thereby providing a flatter spectrum. This provides a broadband pulsed light source apparatus that can be suitably employed in a use that requires SC light having a more uniform intensity over a wide bandwidth. In the present embodiment, the notch filter 31 is employed as an attenuation unit. This enables a simple configuration, thereby providing the above-described effects with a low cost.

It should be noted that, in the processing in which the ripple originating due to the seed light is reduced, the light intensity is not necessarily required to be reduced over the entire oscillation wavelength region Rh of the pulsed laser source 1. Rather, it is sufficient to reduce the light intensity at least at the oscillation wavelength $\lambda_s$.

In many cases, the notch filter 31 as described above is configured as a filter element formed of a dielectric multilayer film. Another example that can be employed as the attenuation unit includes a volume Bragg grating filter. A volume Bragg grating filter (which will be referred to as a "VBG filter" hereafter) is a filter in which a microstructure region having a refractive index that changes periodically is formed in an optical element. The period of the change in the refractive index is designed such that it satisfies the Bragg condition, thereby allowing the light at the corresponding wavelength to be selectively diffracted. It should be noted that, in Japanese language, in some cases, a VBG filter is also referred to as a "volume Bragg diffractive grating", "volume-type Bragg grating", "volume Bragg grating", or the like. Also, a VBG filter is also referred to as a "volume holographic diffractive grating" because such a structure having a diffractive index that changes periodically is formed using holographic technology, or because the structure having a diffractive index that changes periodically is considered to correspond to a hologram.

With such a VBG filter, there is a transmissive type and a reflective type, either of which can be employed as an attenuation unit in the embodiment. Also, as a VBG filter, a chirped type (chirped VBG filter) is known in which the period of the low refractive index/high refractive index is gradually changed. Such a chirped type can be employed as the attenuation unit. FIGS. 3A-3D are schematic diagrams showing several VBG filters.

Figure 3A:
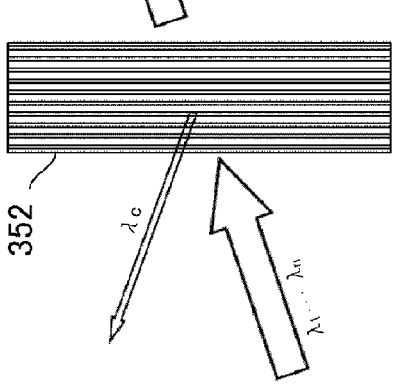
FIG. 3A shows an example employing a transmissive VBG filter.

FIG. 3A shows an example employing a transmissive VBG filter 351. With the transmissive VBG filter 351, only the light at a particular wavelength $\lambda\lambda c$ is refracted in a particular direction according to the period of the change in the refractive index. In contrast, the light components at other wavelengths transmit through without changing direction. Accordingly, by selecting the oscillation wavelength $\lambda_s$ of the pulsed laser source 1 as the particular wavelength $\lambda\lambda c$, the transmissive VBG filter 351 can be preferably employed as the attenuation unit.

Figure 3B:
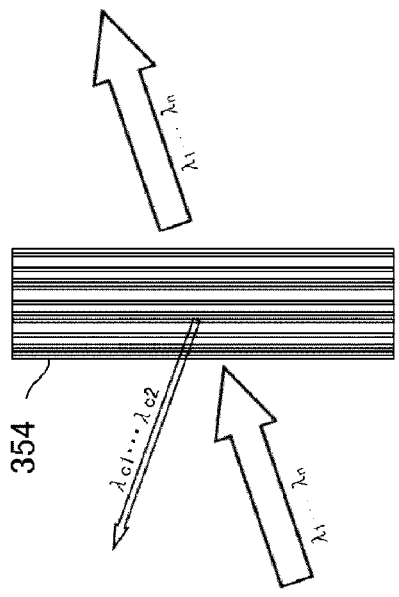
FIG. 3B shows an example employing a reflective VBG filter.

FIG. 3B shows an example employing a reflective VBG filter 352. In a case of employing such a reflective type, only the light at a particular wavelength $\lambda\lambda c$ is reflected in a particular direction according to the period of the change in the refractive index. In contrast, the light at other wavelengths transmits through as it is.

Figure 3C:
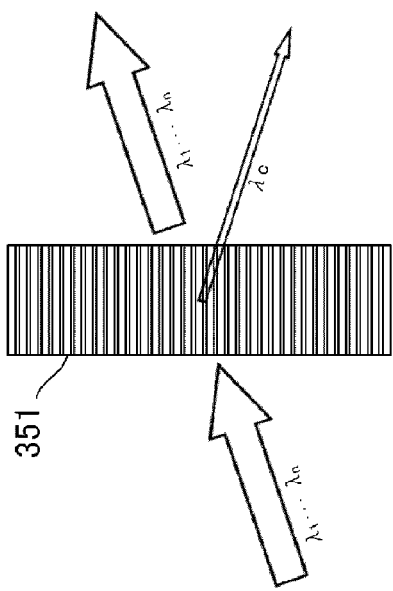
FIG. 3C shows an example employing a transmissive chirped VBG filter.
Figure 3D:
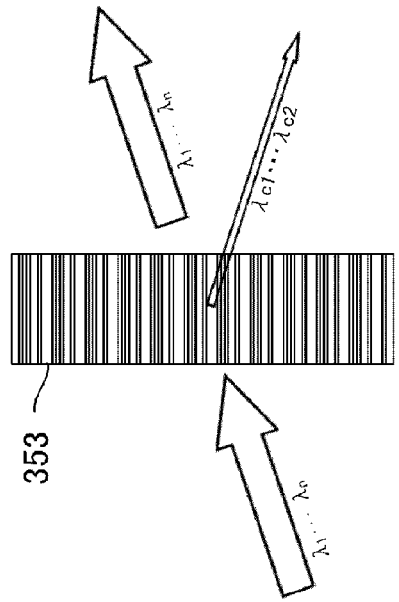
FIG. 3D shows an example employing a reflective chirped VBG filter.

FIGS. 3C and 3D show examples employing chirped VBG filters 353 and 354, respectively. FIG. 3C shows a transmissive type, and FIG. 3D shows a reflective type.

The chirped VBG filters 353 and 354 are each designed such that the period of the change in the refractive index is changed even more periodically. Accordingly, particular light is selectively extracted in a wavelength range that corresponds to the range in which the period of the change in the refractive index is also changed periodically. That is to say, with the transmissive chirped VBG filter 353 shown in FIG. 3C, only the light component in a predetermined wavelength range ($\lambda c1$ to $\lambda c2$) is extracted by refraction. On the other hand, with the reflective chirped VBG filter 354 shown in FIG. 3D, only the light component in a predetermined wavelength width ($\lambda c1$ to $\lambda c2$) is extracted by reflection.

In FIGS. 3A through 3D, the light at wavelengths other than that at $\lambda c$ or in a range of $\lambda c1$ to $\lambda c2$, which is selectively extracted by refraction or reflection, travels along a primary light path (main light path). In contrast, the light at $\lambda c$ or in a range of $\lambda c1$ to $\lambda c2$ travels along a light path deviating from the main light path. In many cases, a beam damper or the like is arranged on the latter light path so as to terminate the light beam such that it is absorbed. However, in some cases, if there is no particular problem, such light is not proactively absorbed and travels as it is. It should be noted that, in many cases, the VBG filters 351 through 354 are each arranged such that the incident light enters obliquely in order to prevent the occurrence of return light. Accordingly, in many cases, such a VBG filter is arranged with an orientation at an angle with respect to the main light path.

Such VBG filters 351 through 354 are each capable of providing a narrower attenuation wavelength region as compared with a notch filter formed of a dielectric multilayer film, and thus are suitable in this respect. In a case of employing a notch filter formed of a dielectric multilayer film, in some cases, the attenuation wavelength region is slightly wider than the half-width of the ripple in the SC light (peak originating due to the seed light). This has the potential to cause a problem in that the light at a particular wavelength that is not to be attenuated is attenuated. In contrast, the VBG filter easily provides selective attenuation in a narrow bandwidth on the order of the half-width of the ripple, thereby allowing only the ripple to be removed with high accuracy, which is advantageous.

It should be noted that, from among the VBG filters, the typical VBG filters 351 and 352 are employed for uses such as laser wavelength stabilization, etc. In particular, the typical VBG filters 351 and 352 each enable selective attenuation in a particularly narrow bandwidth. Accordingly, in a case in which the SC light has a ripple having a very narrow half-width, such a typical VBG filter 351 or 352 is preferably employed. In contrast, in a case in which the ripple does not have such a very narrow half-width, but has a half-width that is narrower than the attenuation wavelength region of a notch filter formed of a dielectric multilayer film, the chirped VBG filter 353 or 354 is preferably employed.

As an example, in a case in which the SC light has a ripple having a half-width of 40 nm or more, this can be handled using a notch filter formed of a dielectric multilayer film. However, in a case in which the ripple has a narrower half-width up to on the order of 2 nm, the chirped VBG filter 353 or 354 is preferably employed. In a case in which the ripple has a half-width of 2 nm or less (or that is below 2 nm), the typical VBG filter 351 or 352 is preferably employed.

It should be noted that such VBG filters 351 and 352 and chirped VBG filters 353 and 354 are available from Opti-Grate Corporation (OptiGrate Corp., 562 South Econ Circle, Oviedo, Florida 32765-4311). Also, custom-made products are available so as to allow an output wavelength or output wavelength bandwidth to be specified. In some cases, the VBG filter is also referred to as a "BragGrate-Notch Filter". That is to say, in some cases, the VBG filter is regarded as a kind of notch filter.

Figure 4:
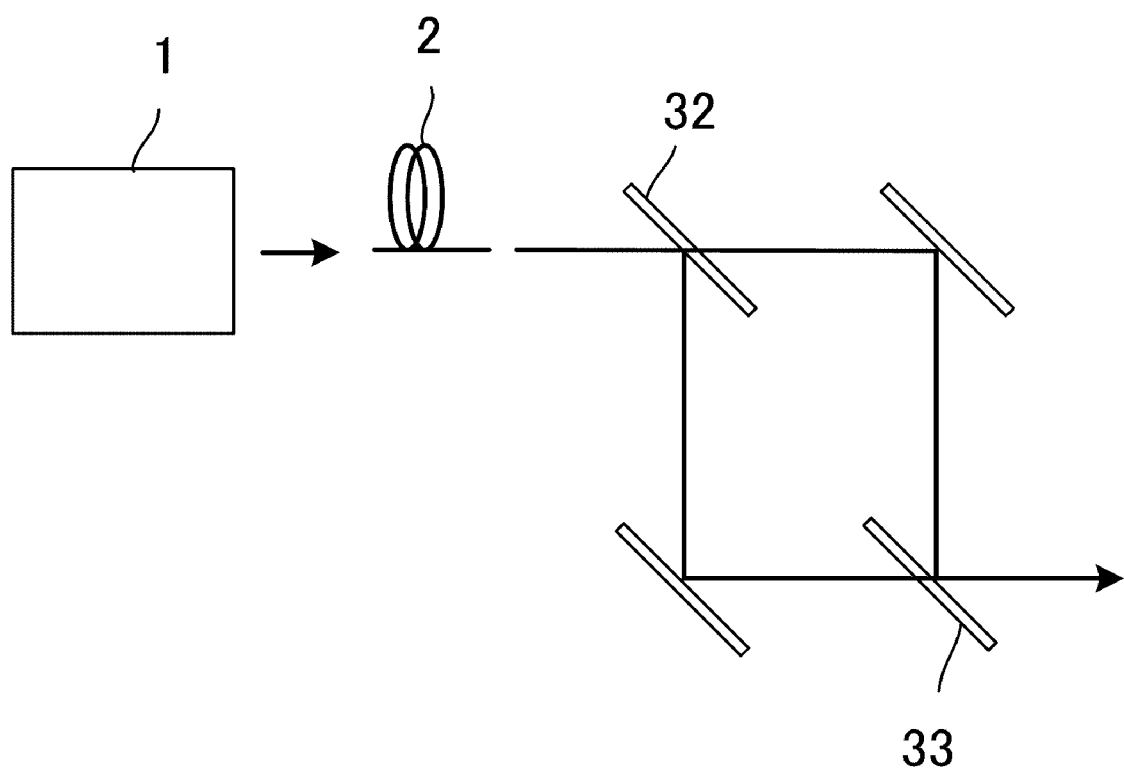
FIG. 4 is a schematic diagram showing a broadband pulsed light source apparatus according to a second embodiment.
Figure 5A:
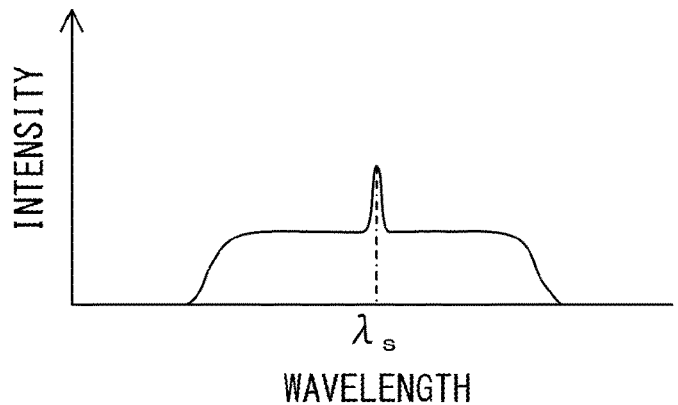
FIG. 5A is a diagram showing a spectrum of the output SC light in the second embodiment.
Figure 5B:
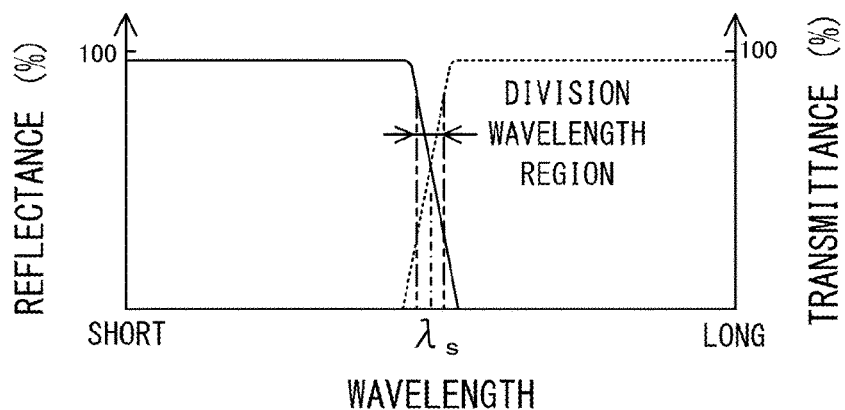
FIG. 5B is a diagram showing spectral reflection/transmission characteristics of the dichroic mirror employed as the attenuation unit in the second embodiment.
Figure 5C:
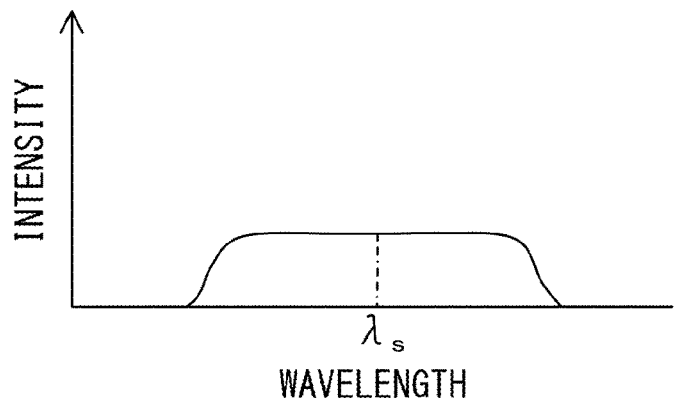
FIG. 5C is a diagram showing the spectrum of the SC light after the light superimposition by means of the multiplexing element in the second embodiment.

Next, description will be made regarding a broadband pulsed light source apparatus according to a second embodiment. FIG. 4 is a schematic diagram showing the broadband pulsed light source apparatus according to the second embodiment. In the second embodiment, a dichroic mirror 32 is employed as an attenuation unit. FIGS. 5A-5C are schematic diagrams showing the attenuation unit employed in the second embodiment. FIG. 5A is a diagram showing a spectrum of the output SC light. FIG. 5B is a diagram showing spectral reflection/transmission characteristics of the dichroic mirror employed as the attenuation unit. In FIG. 5B, the solid line indicates the spectral reflection characteristics, and the broken line indicates the spectral transmission characteristics.

The dichroic mirror is an optical element that divides light at a division wavelength so as to allow the light on one side of the wavelength region to transmit through and to reflect the light on the other side. In actuality, the transition between transmission and reflection occurs over a certain wavelength region, which will be referred to as the "division wavelength region". In the following example, the overlap portion of the wavelength region in which the transmittance is equal to or smaller than 80% of the peak (maximum value) and the wavelength region in which the reflectance is equal to or smaller than 80% of the peak will be defined as the "division wavelength region". As shown in FIGS. 5A and 5B, in the present embodiment, the oscillation wavelength of the pulsed laser source 1 is within the division wavelength region. It should be noted that, in particular, the wavelength at which the transmission characteristics and the reflection characteristics intersect (wavelength at which the transmittance and the reflectance are equal) will be referred to as the "division wavelength". Typically, the division wavelength is at the center of the division wavelength region.

As shown in FIG. 4, a wave combiner 33 is provided so as to superimpose the light split by the dichroic mirror 32. In this example, the wave combiner 33 is configured as a dichroic mirror. The wave combiner 33 is configured as a dichroic mirror that reflects the light at wavelengths that are longer than the division wavelength region and to allow the light at wavelengths that are shorter than the division wavelength region to transmit through. Although the relation between the reflection/transmission characteristics is reversed, the division wavelength region of the wave combiner 33 approximately matches the division wavelength region of the dichroic mirror 32.

FIG. 5C shows the spectrum of the SC light after the light superimposition by means of the wave combiner 33. The spectral reflection/transmission characteristics of the dichroic mirror 32 configured as the attenuation unit are appropriately selected so as to provide a flat spectral intensity. In this example, a dichroic mirror is also employed as the wave combiner 33. Accordingly, the spectral reflection/transmission characteristics are also selected giving consideration to attenuation provided by the wave combiner 33. For example, in a case of providing an attenuation ratio on the order of 50% as a whole, as shown in FIG. 5B, the dichroic mirror 32 configured as an attenuation unit is designed to have spectral reflection/transmission characteristics so as to provide both transmission and reflection on the order of 50% at the division wavelength. That is to say, the light at the oscillation wavelength of the pulsed laser source 1 is reflected with a reflectance on the order of 50%, and is transmitted through with a transmittance on the order of 50% by means of the dichroic mirror 32. In this case, the wave combiner 33 configured as a dichroic mirror is designed to have both reflectance and transmittance on the order of 50% at the division wavelength. With such an arrangement, in a case in which the oscillation wavelength $\lambda_s$ of the pulsed laser source 1 is equal to the division wavelength, the light at the oscillation wavelength $\lambda_s$ is attenuated on the order of 50% in the final stage. Accordingly, the output SC light spectrum has a flat intensity distribution as a whole as shown in FIG. 5C. As can be understood from the explanation described above, in this example, the two dichroic mirrors 32 and 33 provide an attenuation unit.

With such an arrangement employing the dichroic mirror 32 as an attenuation unit, this provides selective attenuation while splitting the wavelengths of the SC light. Accordingly, this enables illumination of the SC light using the effects of the splitting of wavelengths. Such an arrangement is convenient in a case in which the light divided into two wavelength regions is to be separately irradiated to a target object, in a case in which the light in each different wavelength region is to be irradiated in a corresponding different state, or the like, for example.

It should be noted that the oscillation wavelength $\lambda_s$ may not necessarily match the division wavelength. Rather, in a case in which the oscillation wavelength $\lambda_s$ is within the division wavelength region, this also provides sufficient effects. It should be noted that, in a case in which the division wavelength region is defined as 70% or less instead of 80% or less, such an arrangement has a higher potential to provide improved attenuation, which is preferable. Also, in a case in which the division wavelength region is defined as 60% or less, this provides a further preferable arrangement.

Figure 6:
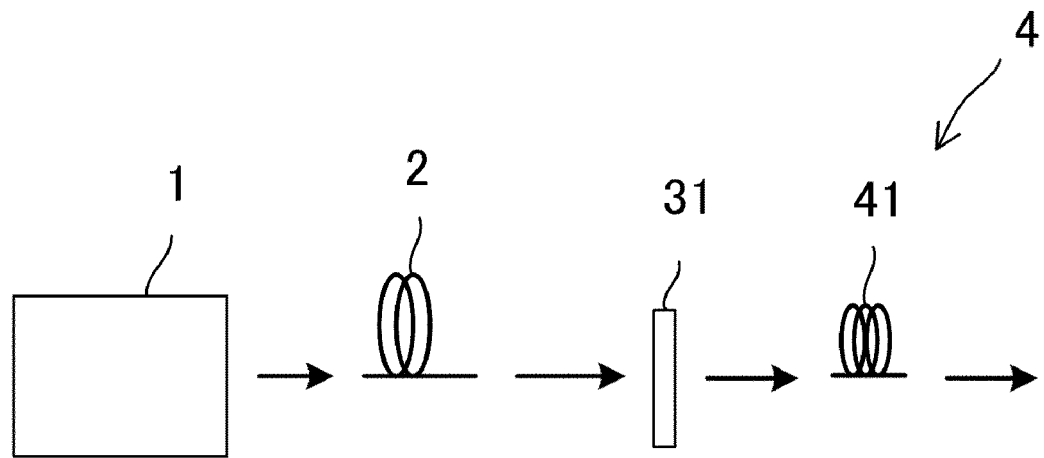
FIG. 6 is a schematic diagram showing a broadband pulsed light source apparatus according to a third embodiment.
Figure 7:
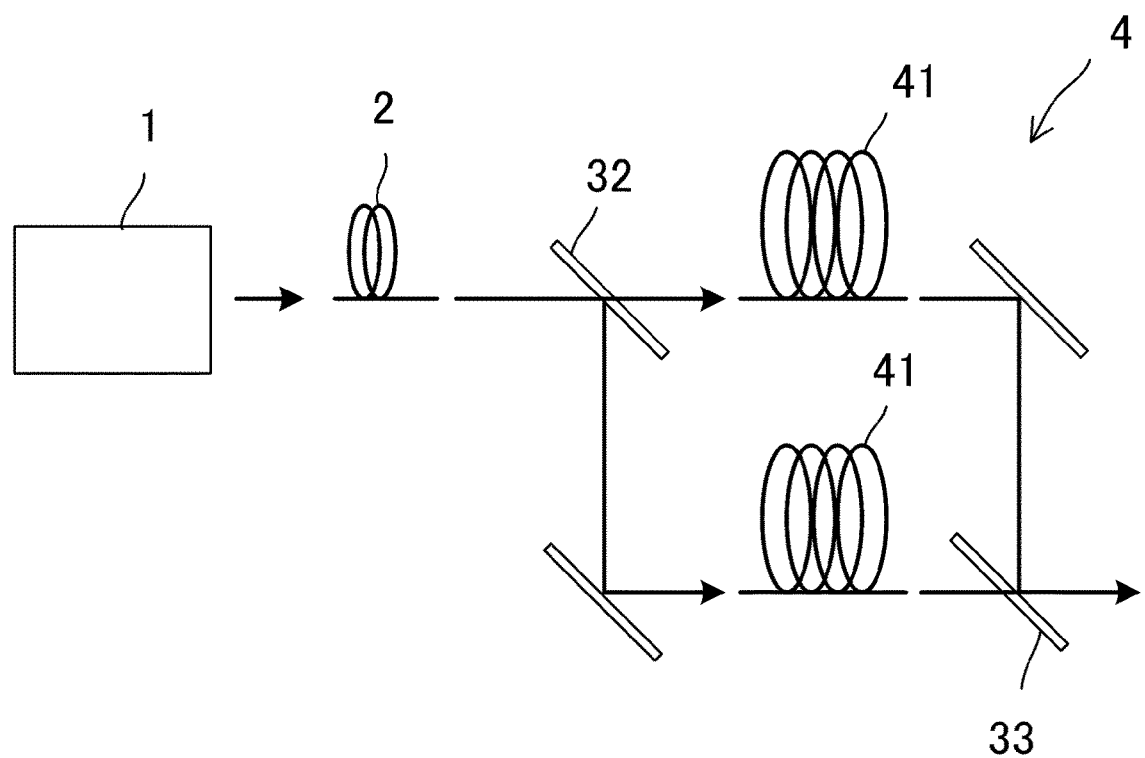
FIG. 7 is a schematic diagram showing a broadband pulsed light source apparatus according to a fourth embodiment.

Next, description will be made regarding a third embodiment and a fourth embodiment. FIG. 6 is a schematic diagram showing a broadband pulsed light source apparatus according to a third embodiment. FIG. 7 is a schematic diagram showing a broadband pulsed light source apparatus according to a fourth embodiment.

Figure 8:
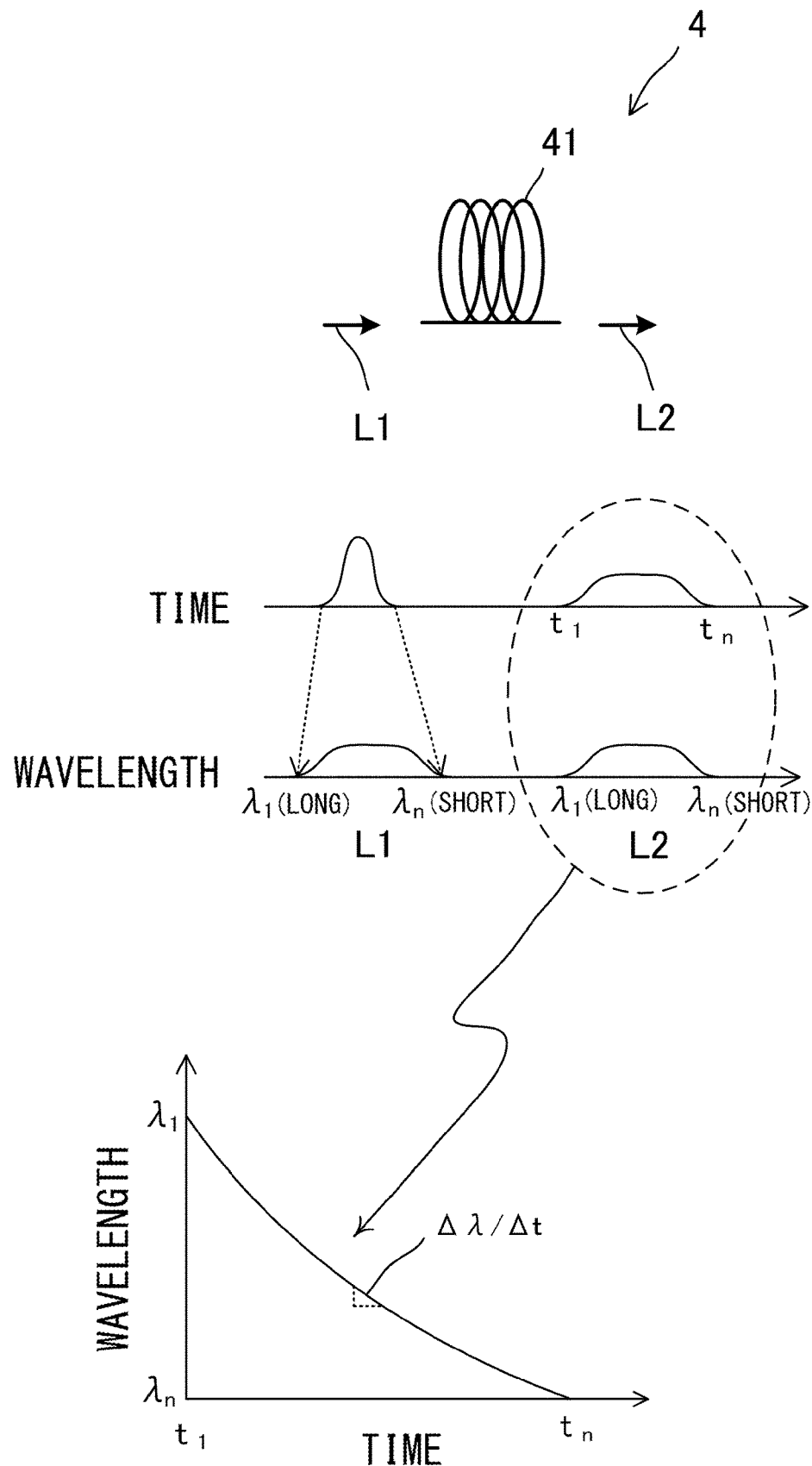
FIG. 8 is a schematic diagram showing pulse stretching.

As shown in FIGS. 6 and 7, the broadband pulsed light source apparatuses each include a stretching element 4 that extends the pulse width of the supercontinuum light output from the nonlinear element 2. The third embodiment shown in FIG. 6 is an embodiment further including the stretching element 4 in addition to the first embodiment. The fourth embodiment shown in FIG. 7 is an embodiment further including the stretching element 4 in addition to the second embodiment. Description will be made regarding the stretching element 4. FIG. 8 is a schematic diagram showing pulse stretching.

The generated SC light has a widened wavelength bandwidth, but as it is, it is still an ultrashort pulse on the order of femtoseconds or picoseconds. It is difficult to use such SC light as it is depending on the usages. Accordingly, pulse stretching is applied. As the stretching element 4, an arrangement may be made employing a fiber having particular group delay characteristics such as a dispersion compensating fiber (DCF) or the like. For example, in a case in which the SC light L1 having a continuous spectrum in a certain wavelength region is transmitted through a group delay fiber 41 having positive dispersion characteristics in this wavelength region, this effectively extends the pulse width. That is to say, as shown in FIG. 8, the SC light L1 is an ultrashort pulse in which the light at the longest wavelength $\lambda_1$ exists at the beginning of each pulse. Subsequently, the wavelength of the light that exists in the pulse gradually becomes shorter according to the passage of time. At the end of the pulse, the light exists with the shortest wavelength $\lambda_n$. This light is transmitted through the group delay fiber 41 having normal dispersion characteristics. With the group delay fiber 41 having such normal dispersion characteristics, as the wavelength of the light becomes shorter, the propagation becomes later. This increases the time difference in each pulse. Specifically, when the light is output from the fiber 41, the short-wavelength light propagates later as compared with long-wavelength light. As a result, the output SC light L2 is generated as light having an extended pulse width and a one-to-one correspondence between the time and the instantaneous wavelength. That is to say, as shown in the lower part of FIG. 8, pulse stretching is applied in a state in which the times $t_1$ through $t_n$ respectively correspond to the wavelengths $\lambda_1$ through $\lambda_n$ in a one-to-one manner.

It should be noted that, as the fiber 41 to be used for the pulse stretching, an anomalous dispersion fiber may be employed. In this case, dispersion is provided so as to delay the light on the long-wavelength side that exists at the beginning of a pulse of the SC light, and so as to advance the light on the short-wavelength side that exists at subsequent time points. This leads to the reverse of the temporal relation in each pulse. Specifically, pulse stretching is provided such that the light on the short-wavelength side exists at the beginning of each pulse, and such that the wavelength of the light that exists becomes longer according to the passage of time. It should be noted that the propagation distance for the pulse stretching is required to be further extended as compared with the normal dispersion fiber. This has a tendency to involve large loss. Accordingly, because of this point, a normal dispersion fiber is preferably employed.

As described above, with the broadband pulsed light source apparatuses according to the third and fourth embodiments, the broadband pulsed light is output with a widened pulse width as well as a widened wavelength bandwidth. Accordingly, such a broadband pulsed light source apparatus can be employed for various kinds of purposes. In particular, in these embodiments, this provides a one-to-one correspondence between the elapsed time and the instantaneous wavelength of light in the pulse, thereby outputting more convenient broadband pulsed light.

Figure 9:
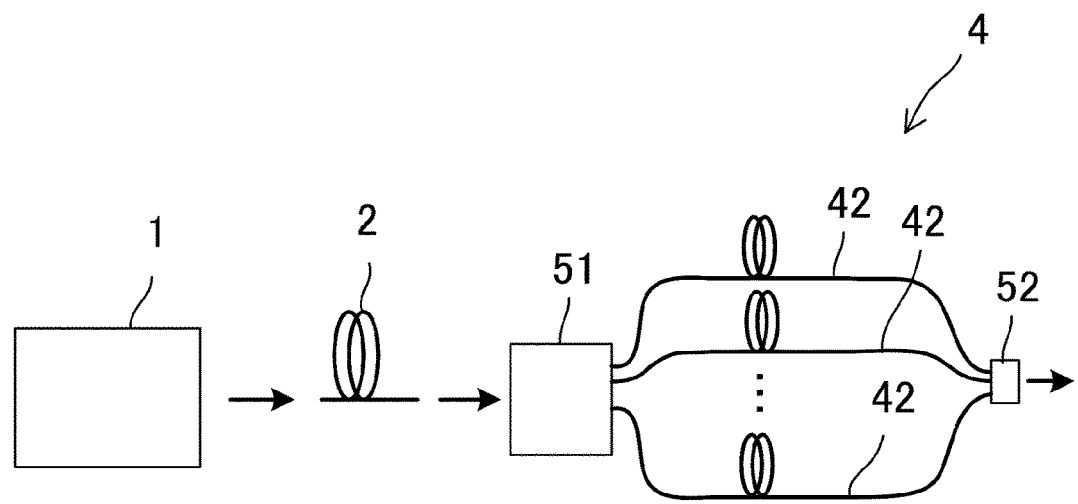
FIG. 9 is a schematic diagram showing a broadband pulsed light source apparatus according to a fifth embodiment.

Next, description will be made regarding a broadband pulsed light source apparatus according to a fifth embodiment. FIG. 9 is a schematic diagram showing the broadband pulsed light source apparatus according to the fifth embodiment.

The broadband pulsed light source apparatus according to the fifth embodiment is also configured as an apparatus including the stretching element 4. In this embodiment, a divider is provided so as to spatially divide the SC light output from the nonlinear element 2 into light for each wavelength region. As the divider in this embodiment, an arrayed waveguide grating (AWG) 51 is employed.

Figure 10:
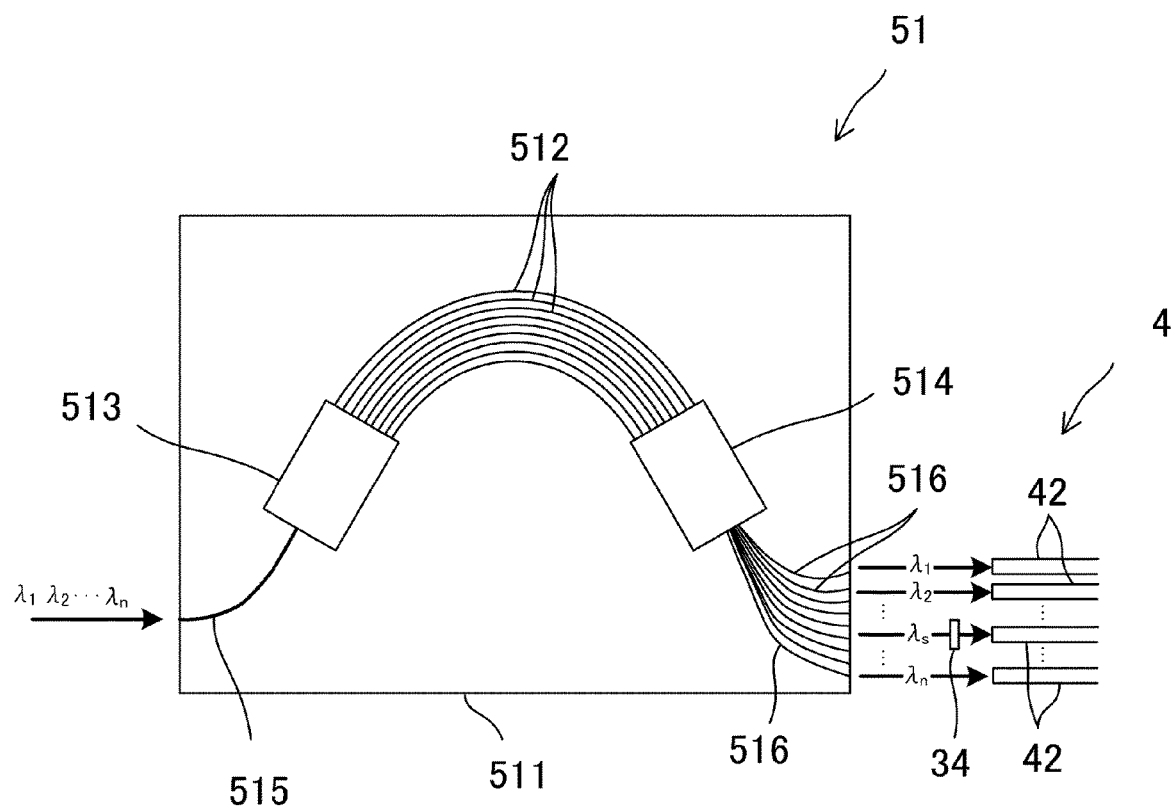
FIG. 10 is a schematic diagram showing an arrayed waveguide grating employed in the fifth embodiment.

FIG. 10 is a schematic diagram showing an arrayed waveguide grating employed in the fifth embodiment. As shown in FIG. 10, an arrayed waveguide grating 51 is configured of functional waveguides 512 through 526 formed on a substrate 511. The functional waveguides include a great number of grating waveguides 512 having slightly different light path lengths, slab waveguides 513 and 514 respectively coupled to both ends (incident side and output side) of the grating waveguides 512, an incident-side waveguide 515 via which light is to be made incident to the incident-side slab waveguide 513, and an output waveguide 516 via which light for each wavelength is extracted from the output-side slab waveguide 514.

The slab waveguides 513 and 514 are each a free space. The light incident to the incident-side waveguide 515 is spread in the incident-side slab waveguide 513, following which the light is incident to the grating waveguides 512. The grating waveguides 512 have slightly different lengths. Accordingly, after the light reaches the end of each grating waveguide 512, the light is shifted in phase corresponding to the difference in the lengths of the grating waveguides 512 (phase shifted). The light is output as diffracted light from each grating wavelength 512. The diffracted light transmits through the output-side slab waveguide 514 while undergoing mutual interference, following which the light reaches the incident end of the output-side waveguides 516. In this case, due to the interference and the phase shift, a light pattern occurs at the incident ends of the output-side waveguides 516 such that particularly high light intensities occur at positions that correspond to particular wavelengths. That is to say, the light having wavelengths thus sequentially differentiated is incident to the output-side waveguides 516, thereby spatially dispersing the light. Each output-side waveguide 516 is formed such that the incident end thereof is positioned so as to receive the dispersed light.

Such an arrayed waveguide grating 51 can be manufactured by applying surface processing to a substrate 511 formed of Si, for example. Specifically, a cladding layer ($SiO_2$ layer) is formed on the surface of the substrate 511 formed of Si using a flame deposition method. In the same manner, a $SiO_2$—$GeO_2$ layer is formed as a core layer using the flame deposition method. Subsequently, the $SiO_2$—$GeO_2$ layer is patterned by photolithography so as to form waveguides 512 through 516, thereby manufacturing the arrayed waveguide grating 51. Each grating waveguide 512 may preferably be designed to have a line width on the order of 5 to 6 µm, for example.

The number of the output-side waveguides 516 to be formed depends on the wavelength width of the broadband pulsed light. For example, in a case in which the arrayed waveguide grating 51 is employed for light having a continuous spectrum over the wavelength width on the order of 900 nm to 1700 nm, the number of the output-side waveguides 516 is designed to be on the order of 10 to 100. With this, the light is output such that it is divided into different wavelengths that change in increments of 3 to 60 nm.

With this embodiment, a fiber 42 is employed as the stretching element 4. In this embodiment, multiple fibers 42 are provided as the stretching element 4, which are respectively coupled to the corresponding output-side waveguides 516 of the arrayed waveguide grating 51.

The fibers 42 may be formed to be the same (same material and same structure) with the same length. Also, different fibers or the same fibers having different lengths are preferably employed. In this embodiment, the light divided into respective wavelength regions by the divider is transmitted via the fibers 42 while applying pulse stretching. Accordingly, by employing fibers having characteristics and lengths designed according to the wavelength regions, this provides optimized pulse stretching. As described above, the pulse stretching is provided using group velocity dispersion provided by the fiber. Accordingly, the characteristics as used here are dispersion characteristics.

For example, the same fibers having different lengths designed according to the respective wavelength regions are preferably employed. The group delay amount that occurs in the fiber depends on the length of the fiber. Accordingly, by employing a fiber having a suitable length according to each wavelength region, this provides an appropriate group delay for each wavelength region, thereby providing optimum pulse stretching. For example, in a case in which a fiber having normal dispersion characteristics in a given wavelength region is employed, the absolute value of the dispersion value (negative value) changes according to the wavelength. Accordingly, after the light is output from the fibers (pulse-extended light), this does not provide a uniform slope of the wavelength with respect to the time ($\Delta \times / \Delta t$ in FIG. 8). In this case, by appropriately selecting the length of each fiber 42 in the configuration described above, this provides a more uniform slope $\Delta \lambda / \Delta t$. Other than changing the lengths of the fibers 42, fibers having different dispersion characteristics may be employed. That is to say, fibers 42 having appropriate dispersion characteristics designed according to the wavelengths of the light output from the respective output-side waveguides 516 are preferably coupled and employed.

It should be noted that, as shown in FIGS. 9 and 10, in this embodiment, the wave combiner 52 is provided on the output side of the multiple fibers 42 configured as the stretching element 4. The wave combiner 52 is configured as an element that superimposes the light output from the respective fibers 42 so as to form a single light flux, and outputs the light flux thus formed from the apparatus. For example, a fan-in/fan-out device is preferably configured as the wave combiner 52. Examples of such known fan-in/fan-out devices include fan-in/fan-out devices such as a fused-fiber coupler, spatial fan-in/fan-out devices, etc., any one of which may be employed.

In the arrangement according to the fifth embodiment, the attenuation unit is configured as a mechanism that selectively attenuates the light at the oscillation wavelength of the pulsed laser source 1 from among the output light of the arrayed waveguide grating 51 configured as a divider. Specifically, as shown in FIG. 10, from among the output-side waveguides 516 of the arrayed waveguide grating 51, a dimmer filter 34 is provided between the output-side waveguide 516 that is to output the light at the oscillation wavelength of the pulsed laser source 1 and the corresponding fiber 42. The dimmer filter 34 may be configured as an ND (Neutral Density) filter, or may be configured as a notch filter or a VBG filter configured to selectively attenuate the light at the oscillation wavelength of the pulsed laser source 1. With this, the SC light is output with an intensity having a flat spectrum distribution. Also, the ND filter 34 may be provided between the fiber 42 that transmits the light at the oscillation wavelength of the pulsed laser source 1 and the wave combiner 52.

Figure 11:
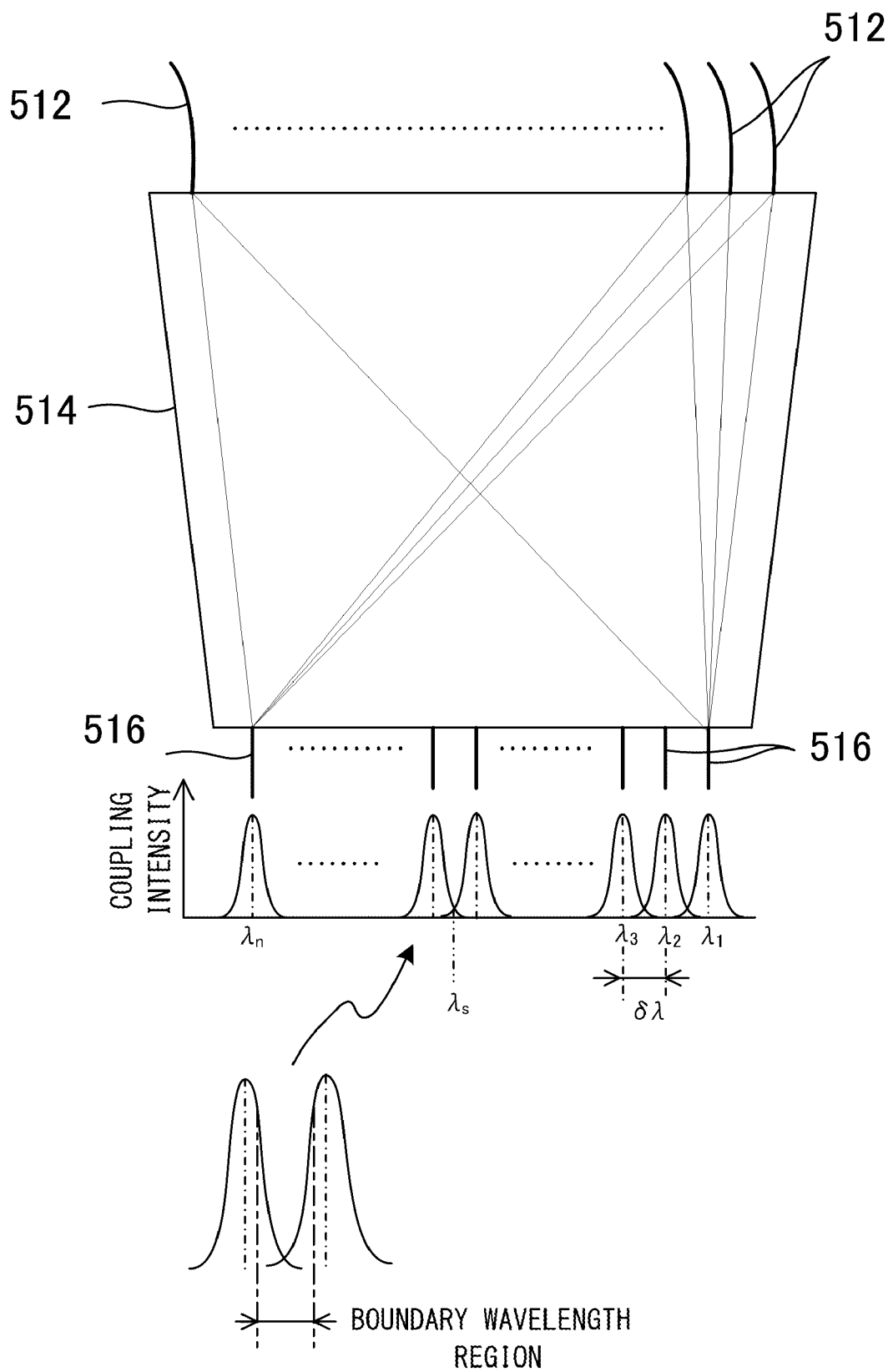
FIG. 11 is a schematic diagram showing an example of an arrayed waveguide grating configured as an attenuation unit.

Instead of employing the ND filter 34, the arrayed waveguide grating may be configured to have a function of selectively attenuating the light as a function of the waveguide grating itself. Description will be made with reference to FIG. 11 regarding this point. FIG. 11 is a schematic diagram showing an example in which the arrayed waveguide grating itself functions as an attenuation unit.

Several examples are conceivable with respect to the attenuation unit provided by the arrayed waveguide grating. As a preferable example, the arrayed waveguide grating is designed and manufactured such that the oscillation wavelength of the pulsed laser source 1 is within one boundary wavelength region provided by the output-side slab waveguide of the arrayed waveguide grating itself. FIG. 11 shows this example. The boundary wavelength region is defined as a region in which the coupling intensity is 80% or less with respect to the peak, for example.

With the arrayed waveguide grating 51, as described above, the grating waveguides 512 provide a phase difference. The diffracted light occurs with a high intensity at different positions in the output-side slab waveguide 514 such that they are sequentially differentiated according to the wavelengths due to the phase difference and interference. The arrayed waveguide grating 51 uses this effect. Specifically, the incident ends of the output-side waveguides 516 are arranged at positions at which the light intensity becomes high. The light intensity that occurs in the output-side waveguide will be referred to as the "coupling intensity" hereafter. The positions and the wavelengths at which the coupling intensity of the refracted light becomes strong are determined based on the design of the optical path length difference to be provided by each grating waveguide 512, the design of the output-side slab waveguide 514, etc. That is to say, as shown in FIG. 11, the coupling intensity of the light at the wavelengths $\lambda_1, \lambda_2, \lambda_3, \ldots, \lambda_n$ becomes high at these respective positions. In this case, the arrayed waveguide grating 51 is designed such that the oscillation wavelength of the pulsed laser source 1 is within a boundary wavelength region of any of the wavelengths $\lambda_1, \lambda_2, \lambda_3, \ldots, \lambda_n$. With this, the SC light is spatially wavelength-divided in a state in which the light at the oscillation wavelength is effectively attenuated.

In the configuration described above, $\delta\lambda$ with regard to the wavelengths $\lambda_1, \lambda_2, \lambda_3, \ldots, \lambda_n$ corresponds to the wavelength resolution provided by the arrayed waveguide grating 51. The boundary wavelength region is slightly narrower than the width of $\delta\lambda$. As a preferable example of the design, as shown in FIG. 11, the arrayed waveguide grating 51 is designed such that the central wavelength of one of the boundary wavelength regions matches the oscillation wavelength $\lambda_s$ of the pulsed laser source 1.

As described above, with such an arrangement in which the arrayed waveguide grating 51 provides selective attenuation as a function of the arrayed waveguide grating itself, this requires no ND filter, thereby providing a simple configuration, and thereby providing a reduced cost. Description has been made above regarding an example in which the oscillation wavelength $\lambda_s$ of the pulsed laser source 1 is positioned at the center of the boundary wavelength region. Also, such effects can be obtained so long as the oscillation wavelength $\lambda_s$ is within the boundary wavelength region. It should be noted that, instead of defining the boundary wavelength region to be 80% or less, the boundary wavelength region may be defined to be 60% or less, thereby providing further attenuation, which is preferable. Also, the boundary wavelength region may be defined to be 40% or less, which is more preferable. Instead of the configuration described above, an arrangement may also be made in which the oscillation wavelength of the pulsed laser source 1 is located within one from among the wavelength regions divided by the arrayed waveguide grating 51, and a portion configured to attenuate the light is provided in the waveguide for the wavelength region (e.g., the corresponding grating waveguide 512). It should be noted that, in this arrangement, one from among the wavelength regions divided by the arrayed waveguide grating 51 is attenuated as a whole, leading to a new loss due to this arrangement. With the arrangement in which the oscillation wavelength of the pulsed laser source 1 is located within one from among the boundary wavelength regions, this does not involve such a new loss, which is preferable in that respect.

In the fifth embodiment, the fiber 42, which forms the stretching element 4, is coupled to each output-side waveguide 516 so as to provide pulse stretch such that the time and instantaneous wavelength correspond to each other in a one-to-one manner. Each fiber 42 is designed to have appropriate characteristics and an appropriate length according to the wavelength region to be transmitted so as to provide optimized pulse stretch.

Figure 12:
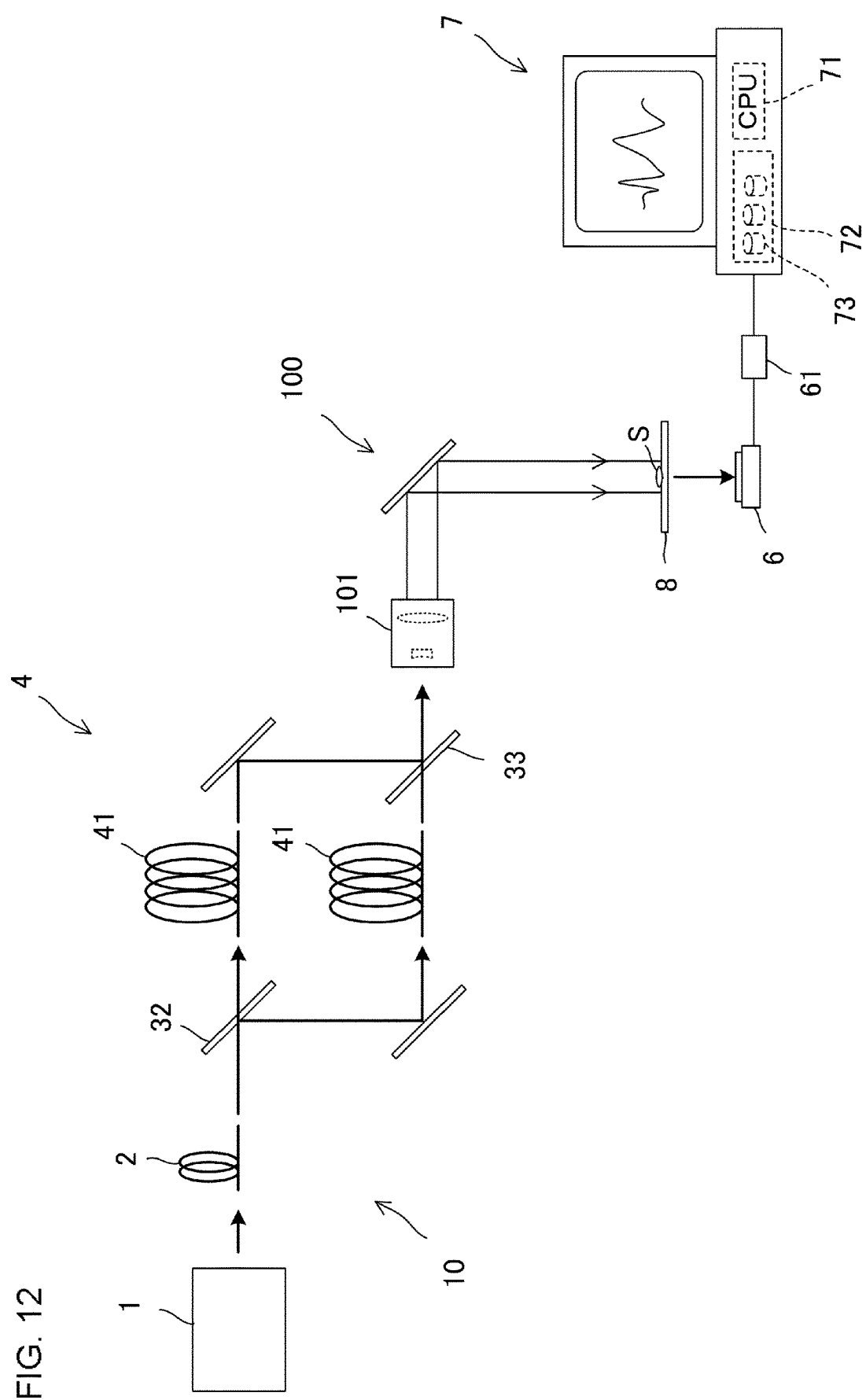
FIG. 12 is a schematic diagram showing a spectroscopic measurement apparatus according to a first embodiment.

Next, description will be made regarding an embodiment of a spectroscopic measurement apparatus and a spectroscopic measurement method. FIG. 12 is a schematic diagram showing a spectroscopic measurement apparatus according to a first embodiment. The spectroscopic measurement apparatus shown in FIG. 12 includes a broadband pulsed light source apparatus 10, an illumination optical system 100 that irradiates broadband pulsed light output from the broadband pulsed light source apparatus 10, a photoreceiver 6 arranged at a position at which light from an irradiated target object S is incident, and a calculation unit 7 that calculates a spectroscopic spectrum with respect to the target object S based on the output from the photoreceiver 6.

As the broadband pulsed light source apparatus (which will be simply referred to as a "light source apparatus" hereafter) 10, the light source apparatus according to the fourth embodiment provided with the stretching element 4 is employed. Also, the light source apparatus according to the third embodiment or the fifth embodiment may be employed. In this embodiment, the illumination optical system 100 includes a beam expander 101. Such an arrangement is made giving consideration to a small beam diameter of the light output from the pulsed laser source 1, although the light source apparatus 10 outputs time-extended broadband pulsed light. Instead of such an arrangement, in some cases, a scanning mechanism such as a mirror galvanometer may be provided so as to cover a wide illumination region by beam scanning.

As the photoreceiver 6, a device configured to convert the intensity of received light into an electrical signal, and to output the signal thus converted, is employed. Specifically, a photodetector such as a photodiode or the like having sensitivity for the measurement wavelength region is employed. This embodiment is described assuming that an absorption spectrum is measured for the target object S. Accordingly, the photoreceiver 6 is arranged at a position at which the transmitted light from the target object S is incident. In order to arrange the target object S, a transparent receiving plate 8 is provided. The illumination optical system 100 is configured to irradiate light from above. The photoreceiver 6 is arranged below the receiving plate 8.

As the calculation unit 7, in this embodiment, a general-purpose PC is employed. An AD converter 61 is provided between the photoreceiver 6 and the calculation unit 7. The output of the photoreceiver 6 is input to the calculation unit 7 via the AD converter 61.

The calculation unit 7 includes a processor 71 and a storage unit (hard disk, memory, or the like) 72. The storage unit 72 stores a measurement program 73 for converting the output signal from the photoreceiver 6 into a spectrum and other kinds of necessary programs as installed programs.

The light source apparatus 10 employed in this embodiment illuminates broadband extended pulsed light having a one-to-one correspondence between the time and the instantaneous wavelength. Accordingly, the measurement program 73 is optimized based on this feature. FIG. 13 is a schematic diagram showing main components of an example of the measurement program 73 provided to the spectroscopic measurement apparatus.

FIG. 13 shows an example of the measurement program 73 for measuring an absorption spectrum (spectral absorptivity). Reference spectrum data is used in the calculation of the absorption spectrum. The reference spectrum data provides a value for each wavelength to be used as a reference for calculating the absorption spectrum. The reference spectrum data is acquired by making the light from the light source apparatus 10 incident to the photoreceiver 6 without transmitting through the target object S. That is to say, the light is directly incident to the photoreceiver 6 without transmitting through the target object S, the output of the photoreceiver 6 is input to the calculation unit 7 via the AD converter 61, thereby acquiring values in increments of $\Delta t$ which is the time resolution. The values are each stored as the reference intensities $(V_1, V_2, V_3, \ldots)$ at the time points $t_1, t_2, t_3, \ldots$, in increments of $\Delta t$. The time resolution $\Delta t$ is determined by the response speed (signal discharge period) of the photoreceiver 6, which represents the time interval at which a signal is output.

The reference intensities $V_1, V_2, V_3, \ldots$, at the respective time points $t_1, t_2, t_3, \ldots$, represent the intensities (spectrum) at the corresponding wavelengths $\lambda_1, \lambda_2, \lambda_3, \ldots$. The relation between the time points $t_1, t_2, t_3, \ldots$, and the wavelengths is measured beforehand. Accordingly, the values $V_1, V_2, V_3, \ldots$, at the respective time points are treated as the values at the respective wavelengths $\lambda_1, \lambda_2, \lambda_3$.

With this, in the same manner, when the light is incident to the photoreceiver 6 after it transmits through the target object S, the output from the photoreceiver 6 is stored in memory as the values (measurement values) $(v1, v2, v3, \ldots)$ at the respective time points $t_1, t_2, t_3$, via the AD converter 61. The respective measurement values are compared with the reference spectrum data $(v_1/V_1, v_2/V_2, v_3/V_3, \ldots )$. As a result, an absorption spectrum is acquired (strictly, acquired by calculating the logarithm of the reciprocal of each value). The measurement program 73 is programmed so as to provide the calculation processing as described above.

Next, description will be made regarding the operation of the spectroscopic measurement apparatus described above. In the following explanation, an explanation of an embodiment of the spectroscopic measurement method will also be made. In a case of executing spectroscopic measurement using the spectroscopic measurement apparatus according to the embodiment, the light source apparatus 10 is operated in a state in which no target object S is arranged so that the light is directly incident to the photoreceiver 6 without transmitting through the target object S. Subsequently, the output signal from the photoreceiver 6 is processed so as to acquire the reference spectrum data beforehand. In the next stage, the target object S is arranged on the receiving plate 6, and the light source apparatus 10 is operated again. In this state, the light is incident to the photoreceiver 6 after it transmits through the target object S. The output signal from the photoreceiver 6 is input to the calculation unit 7 via the AD converter 61, thereby acquiring a spectrum using the measurement program 73.

Description has been made above regarding an example in which the absorption spectrum is measured using the transmitted light from the target object S. In some cases, the reflection spectrum (spectral reflectance) is measured using the reflected light from the target object S. Also, in some cases, spectral characteristics such as internal scattered light from the target object S are measured. That is to say, the light from the target object S may be transmitted light, reflected light, scattered light, etc., from the target object S thus illuminated.

It should be noted that, in a case in which the measurement results of the light source apparatus 10 or the sensitivity characteristics of the photoreceiver 6 change with time, a calibration operation in which the reference spectrum is acquired (measurement in a state in which no target object S is arranged) so as to update the reference spectrum is periodically performed.

With such a spectroscopic measurement apparatus and a spectroscopic measurement method according to the embodiment, in the spectroscopic measurement, the broadband pulsed light is irradiated to the target object S from the pulsed light source 1 after its pulse width is extended such that the relation between the elapsed time and the wavelength in one pulse exhibits a one-to-one correspondence. Accordingly, this does not require a time-consuming operation such as scanning of a grating or the like, thereby providing high-speed spectroscopic measurement.

In particular, this enables spectroscopic measurement using the illumination of broadband light having a uniform spectral intensity obtained by selectively attenuating the light at the oscillation wavelength of the pulsed laser source 1. This allows the measurement results to be acquired without a need to greatly widen the dynamic range. This provides a spectroscopic measurement apparatus having a high intensity resolution.

The points of advantage are particularly marked in a case of use for material analysis based on slight differences in the spectrum. Description will be made regarding this point with reference to a more specific analysis example.

As a more specific example of the spectroscopic measurement method described above, near-infrared spectroscopic analysis is known. In near-infrared spectroscopic analysis, a material is analyzed in a quantitative manner or the like based on a slight difference in the absorption spectrum. Absorption of near-infrared light occurs due to various kinds of effects and factors. That is to say, there are a great number of variables. Accordingly, in some cases, a chemometrics method (multivariate analysis method) is employed. In such a kind of spectroscopic analysis, the same spectroscopic measurement is performed for a great number of samples each including a known amount of a target component so as to acquire the absorption spectra thereof. Regression analysis (PLS regression or the like) is performed on the great number of measurement results so as to acquire regression coefficients. Subsequently, the same spectroscopic measurement is made for an unknown sample (target object), and the regression coefficients thus acquired are applied to the absorption spectrum thus acquired so as to provide quantitative analysis of a target component.

In a case of performing such spectroscopic analysis with a wide dynamic range, this leads to a degraded intensity resolution due to the limitation of the number of bits that can be used in data processing. Such degraded intensity resolution leads to a problem in that a slight difference in the absorption spectrum cannot be detected, and the analysis cannot be supported. However, with the broadband pulsed light source apparatus according to the embodiment described above, this allows the dynamic range to be reduced. Accordingly, this allows a slight difference in the absorption spectrum to be detected, thereby supporting quantitative analysis. With the spectroscopic analysis performed by comparing the values acquired by such spectroscopic measurement with a reference value, by adjusting the spectrum of the SC light to have an intensity width of 3 dB or less, such an arrangement does not involve such a problem described above. It should be noted that, with regard to the intensity width of 3 dB or less, in some cases, the broadband pulsed light source apparatus outputs light with an intensity width of 3 dB or less over the entire wavelength region of the output light. However, it is sufficient to adjust the light to have an intensity width of 3 dB or less only in a wavelength region to be used for the analysis. Accordingly, such a light source apparatus may be employed. For example, in some cases, the light is adjusted to have a spectral intensity width of 3 dB or less over the wavelength region of 900 nm to 1300 nm. In some cases, the light is adjusted to have a spectral intensity width of 3 dB or less over only a particular portion of 30 nm or more, 50 nm or more, or 100 nm or more, from among the wavelength region of 900 nm to 1300 nm.

Figure 14:
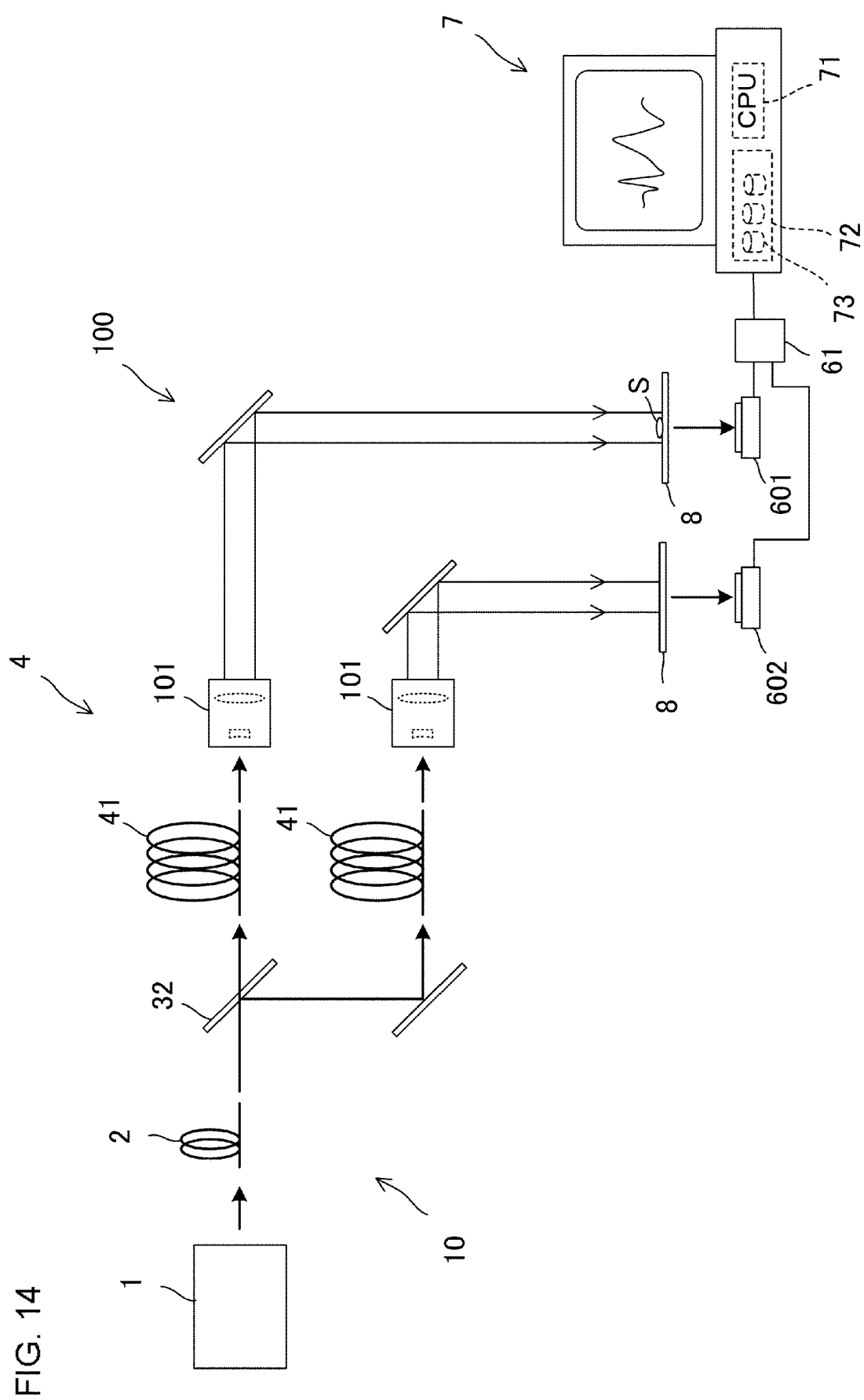
FIG. 14 is a schematic diagram showing a spectroscopic measurement apparatus according to a second embodiment.
Figure 15A:
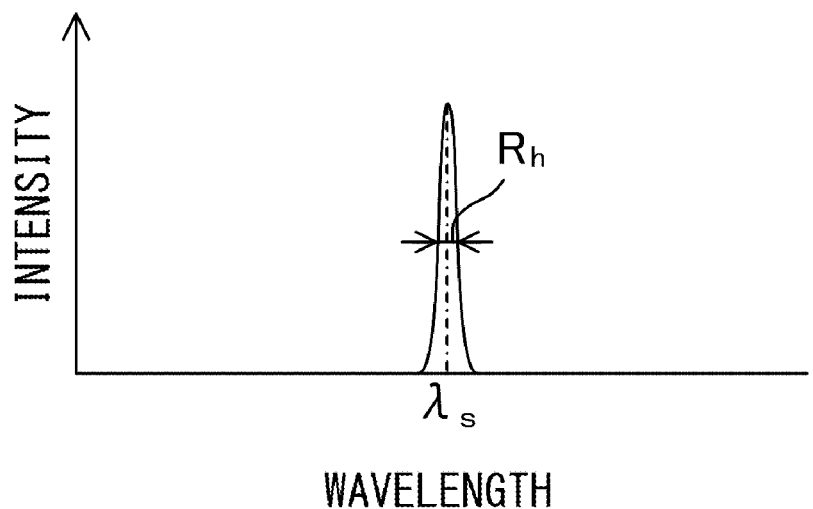
FIG. 15A is a conceptual diagram showing problems in the SC light generation and showing a spectrum of original ultrashort pulsed light.
Figure 15B:
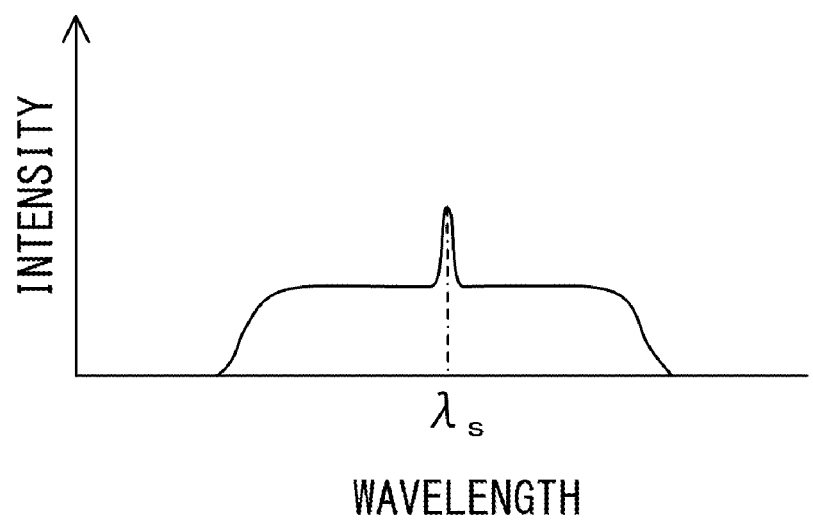
FIG. 15B shows a broadened spectrum of the ultrashort pulsed light transmitted through the nonlinear element such as a nonlinear fiber.

Next, description will be made regarding a spectroscopic measurement apparatus and a spectroscopic measurement method according to a second embodiment. FIG. 14 is a schematic diagram showing the spectroscopic measurement apparatus according to the second embodiment.

As in the first embodiment, the spectroscopic measurement apparatus according to the second embodiment also mounts the light source apparatus 10 including the dichroic mirror 32 as an attenuation unit. The point of difference between the second embodiment and the first embodiment is that the spectroscopic measurement apparatus according to the second embodiment includes no wave combiner. With this, the light in each wavelength region divided by the dichroic mirror 32 is irradiated to the target object S. The light received from the target object S to which the light in each wavelength region is irradiated is received by a corresponding one of the separate photoreceivers 601 and 602.

In this example, the receiving plate 8 is provided on each of the two optical paths on the output side of the dichroic mirror 32. The photoreceivers 601 and 602 are arranged at positions that allow them to receive the light that has transmitted through the target object S mounted on the receiving plate 8. For example, in a case in which the dichroic mirror 32 has characteristics that allow the light at a wavelength that is longer than the division wavelength to transmit through and to reflect the light at a wavelength that is shorter than the division wavelength, the light on the long wavelength side is received by the first photoreceiver 601, and the light on the short wavelength side is received by the second photoreceiver 602. It should be noted that, in the same manner as in the fourth embodiment, the fibers 41 are arranged as the stretching element 4.

In this embodiment, the oscillation wavelength of the pulsed laser source 11 is within the division wavelength region of the dichroic mirror 32. The calculation unit 7 converts the output signal from the first photoreceiver 601 so as to acquire a spectrum in the wavelength region that is longer than the division wavelength. Furthermore, the calculation unit 7 converts the output signal from the second photoreceiver 602 so as to acquire a spectrum in the wavelength region that is shorter than the division wavelength.

Furthermore, in order to acquire a spectrum at the division wavelength, the calculation unit 7 converts either the output signal of the photoreceiver 601 or the output signal of the photoreceiver 602. For example, in a case in which the seed light has twice the spectral intensity in the same manner as described above, by designing the dichroic mirror 32 to have a reflectance of 50% and a transmittance of 50%, light having an intensity attenuated to 50% is incident to both the photoreceivers 601 and 602. Accordingly, this allows the measurement system as a whole to provide measurement without being affected by the ripple of the seed light.

As described above, with such an arrangement in which the light divided by the dichroic mirror 32 is received by a corresponding one from among the separate photoreceivers 601 and 602, this allows a suitable photoreceiver to be employed for each wavelength region. This allows the spectroscopic measurement to be optimized in this respect.

This point described above is closely related to the employment of the light source apparatus 10 that outputs SC light. The light source apparatus 10 configured as a SC light source is capable of outputting pulsed light having a wider bandwidth. However, this arrangement has a problem in that it is difficult for a single photoreceiver to cover such a wide bandwidth. For example, in a case of providing near-infrared spectroscopic measurement, an InGaAs diode photoreceiver employing an InGaAs photoreceiver cell can be preferably employed. However, in a case of providing spectroscopic measurement over a wide bandwidth from the visible light region to the near-infrared region, the InGaAs diode photoreceiver does not have sufficient sensitivity for a short-wavelength region that is below 900 nm. As a photoreceiver having sufficient sensitivity for a wavelength region that is below 900 nm, a Si diode photoreceiver employing a Si photodiode as its photoreceiver cell is known. Accordingly, by respectively employing the InGaAs photoreceiver and a Si diode photoreceiver as the first photoreceiver 601 and the second photoreceiver 602, this provides a spectroscopic measurement arrangement that covers such further widened wavelength regions from the visible light region to the near-infrared region, which is markedly preferable. As another example of such a photoreceiver, a CdS photoreceiver or the like may be employed for the visible light region, for example. Also, a PbS photoreceiver, an InSb photoreceiver, or the like may be employed for the near-infrared region.

With the embodiment shown in FIG. 14, the receiving plate 8 is provided to each light path. Accordingly, in the operation of the spectroscopic measurement, a single target object S is sequentially subjected to the spectroscopic measurement for each wavelength region in a state in which it is arranged on the corresponding receiving plate 8. Subsequently, the measurement results are integrated so as to provide spectroscopic measurement results over the entire wavelength region. In some cases, such an arrangement may include only a single receiving plate 8. In this case, the wavelength region to be measured may be switched by means of a shutter or the like. Specifically, the branched light paths may be integrated by means of a dichroic mirror or the like, and a receiving plate may be arranged at the position at which the branched light paths are integrated. With this, the light in each wavelength region is sequentially irradiated to the target object on the receiving plate by switching using the shutter. Furthermore, the photoreceiver is switched at the same time as the switching by the shutter, thereby providing the spectroscopic measurement sequentially performed for each wavelength region.

Also, such an arrangement employing separate photoreceivers for respective wavelength regions is applicable to an arrangement employing a divider such as an arrayed waveguide grating that provides fine wavelength division. However, detailed description thereof will be omitted. For example, in a case of employing the arrayed waveguide grating 51 described above, the respective fibers 42 coupled to the output-side waveguides 516 are divided into two groups. Each group of the fibers 42 is combined by a wave combiner so as to irradiate the light to the target object S. With this, when the long-wavelength-side group irradiates light to the target object S, the light from the target object S is received by one photoreceiver. When the short-wavelength-side group irradiates light to the target object S, the light from the target object S is received by the other photoreceiver.

It should be noted that three or more wavelength regions to be received may be supported regardless of whether this arrangement employs the dichroic mirror 32 or a divider such as the arrayed waveguide grating 51 or the like. That is to say, an arrangement may be made using three or more photoreceivers so as to provide photoelectric conversion according to each bandwidth.

In a case in which the stretching element 4 is provided to an arrangement according to each embodiment employing the dichroic mirror 32, a divider such as the arrayed waveguide grating 51, or the like, the stretching element 4 may be arranged on the incident side of the dichroic mirror 32 or the divider. That is to say, an arrangement may be made in which, after the pulse stretching, the light may be divided by the dichroic mirror 32 or the divider. It should be noted that, with an arrangement in which, after the light is divided by the dichroic mirror 32 or the divider, each division of the light is subjected to pulse stretching, as described above, such an arrangement enables pulse stretching that corresponds to each wavelength region. In addition, such an arrangement is capable of preventing a sharp ripple having the oscillation wavelength of the pulsed laser 1 from being incident to the stretching element 4. Accordingly, such an arrangement is preferably employed because of the advantage of protecting the stretching element 4.

The light at the oscillation wavelength of the pulsed laser source 1 is selectively attenuated in order to solve the problem of the dynamic range in the measurement. Accordingly, the light may preferably be attenuated at any position on the light path between the nonlinear element 2 and the photoreceiver 6. In some cases, an attenuation unit may be provided between the target object S and the photoreceiver 6. It should be noted that, from the viewpoint of protecting the target object S from a sharp ripple originating due to the seed light, such an attenuation unit is preferably provided on the light path before the target object S.

It should be noted that the "attenuation" provided by the attenuation unit has a broad meaning. That is to say, the "attenuation" is not restricted to a reduction in intensity due to absorption of light by a given element. Rather, the "attenuation" means adjustment such that the dynamic range of the photoreceiver does not become wide. Accordingly, the "attenuation" includes reflection and scattering of the light at the oscillation wavelength of the pulsed laser source so as to exclude a part of the light, thereby reducing the intensity of the light to be incident to the photoreceiver.

It should be noted that, in an example of the spectroscopic measurement apparatus or the spectroscopic measurement method described above, in some cases, an arrangement may be employed in which the light output from the light source apparatus 10 is divided by a beam splitter or the like into measurement light and reference light, the light that has transmitted through the target object S is detected by the photoreceiver 6, and the light is directly incident to another photoreceiver provided for reference without transmitting through the target object S. With this arrangement, the reference spectrum data is acquired in a real-time manner. Accordingly, this requires no calibration as a separate operation, thereby providing improved measurement efficiency.

In addition to the spectroscopic measurement or spectroscopic analysis described above, the broadband pulsed light source apparatus can be applied to various kinds of usages. For example, the broadband pulsed light source apparatus can be applied to a usage such as observation of a target object in the form of an image such as optical coherence tomography (OCT), fluorescence microscopy, etc.

In many cases, the pulsed laser source 1 is configured as an ultrashort pulsed laser source. In some cases, the SC light is generated using a pulsed laser source configured to provide a pulse width that is wider than that of an ultrashort pulsed laser source. In some cases, such a laser source may also be employed.

The invention claimed is:

1. A broadband pulsed light source apparatus comprising:
a pulsed laser source;
a nonlinear element structured to provide a nonlinear effect to light output from the pulsed laser source, so as to output supercontinuum light; and
a notch filter structured to attenuate light component having an oscillation wavelength of the pulsed laser source contained in the supercontinuum light output from the nonlinear element, wherein the notch filter includes a volume Bragg grating filter, and wherein the volume Bragg grating filter is structured to have a stopband corresponding to the oscillation wavelength.

2. The broadband pulsed light source apparatus according to claim 1, further comprising a stretching element structured to extend a pulse width of the supercontinuum light output from the nonlinear element, wherein an output light of the stretching element has a one-to-one correspondence between an instantaneous wavelength and time.

3. A spectroscopic measurement method comprising:
receiving, by means of a photoreceiver, light from a target object to which broadband pulsed light is irradiated from the broadband pulsed light source apparatus according to claim 2; and
converting an output signal from the photoreceiver into a spectrum by means of a calculation unit.

4. A spectroscopic measurement apparatus comprising:
the broadband pulsed light source apparatus according to claim 1;
a photoreceiver structured to receive light from a target object to which broadband pulsed light is irradiated from the broadband pulsed light source apparatus; and
a calculation unit structured to convert an output signal from the photoreceiver into a spectrum.

5. A broadband pulsed light source apparatus comprising:
a pulsed laser source;
a nonlinear element structured to provide a nonlinear effect to light output from the pulsed laser source, so as to output supercontinuum light;
a divider including an arrayed waveguide grating structured to spatially divide the supercontinuum light output from the nonlinear element into multiple light components by wavelength and to output the multiple light components to multiple optical paths;
multiple fibers, each having an input coupled to receive a corresponding one of the multiple light components;
a wave combiner provided on an output side of the multiple fibers; and
a filter provided between the divider and the multiple fibers, on one of the multiple optical paths corresponding to one of the multiple light components having the oscillation wavelength of the pulsed laser source, wherein the multiple fibers have different lengths such that the output light of the wave combiner is a pulsed light which has a one-to-one correspondence between an instantaneous wavelength and time.

6. A spectroscopic measurement apparatus comprising:
the broadband pulsed light source apparatus according to claim 5;
a photoreceiver structured to receive light from a target object to which broadband pulsed light is irradiated from the broadband pulsed light source apparatus; and
a calculation unit structured to convert an output signal from the photoreceiver into a spectrum.

7. A spectroscopic measurement method comprising:
receiving, by means of a photoreceiver, light from a target object to which broadband pulsed light is irradiated from the broadband pulsed light source apparatus according to claim 5; and
converting an output signal from the photoreceiver into a spectrum by means of a calculation unit.

8. A broadband pulsed light source apparatus comprising:
a pulsed laser source;
a nonlinear element structured to provide a nonlinear effect to light output from the pulsed laser source, so as to output supercontinuum light;
a divider including an arrayed waveguide grating structured to spatially divide the supercontinuum light output from the nonlinear element into multiple light components by wavelength and to output the multiple light components to multiple optical paths;
multiple fibers, each having an input coupled to receive a corresponding one of the multiple light components; and
a wave combiner provided on an output side of the multiple fibers,
wherein the arrayed waveguide grating is structured such that, the oscillation wavelength of the pulsed laser source is within a boundary wavelength region of output-side waveguides of the arrayed waveguide grating, one of the multiple light components having the oscillation wavelength of the pulsed laser source is attenuated, and the boundary wavelength being a region in which a coupling intensity is 80% or less with respect to a peak, wherein the multiple fibers have different lengths such that the output light of the wave combiner is a pulsed light which has a one-to-one correspondence between an instantaneous wavelength and time.

9. A spectroscopic measurement apparatus comprising:
the broadband pulsed light source apparatus according to claim 8;
a photoreceiver structured to receive light from a target object to which broadband pulsed light is irradiated from the broadband pulsed light source apparatus; and
a calculation unit structured to convert an output signal from the photoreceiver into a spectrum.

10. A spectroscopic measurement method comprising:
receiving, by means of a photoreceiver, light from a target object to which broadband pulsed light is irradiated from the broadband pulsed light source apparatus according to claim 8; and converting an output signal from the photoreceiver into a spectrum by means of a calculation unit.

\* \* \* \* \*